(12) United States Patent
Soyarslan

(10) Patent No.: US 11,625,448 B2
(45) Date of Patent: Apr. 11, 2023

(54) SYSTEM FOR SUPERIMPOSED COMMUNICATION BY OBJECT ORIENTED RESOURCE MANIPULATION ON A DATA NETWORK

(71) Applicant: LVT Enformasyon Teknolojileri Ltd. Sti., Beyoglu Istanbul (TR)

(72) Inventor: Osman Levent Soyarslan, Beyoglu Istanbul (TR)

(73) Assignee: LVT ENFORMASYON TEKNOLOJILERI LTD. STI, Beyoglu Istanbul (TR)

( * ) Notice: Subject to any disclaimer, the term of this patent is extended or adjusted under 35 U.S.C. 154(b) by 488 days.

(21) Appl. No.: 16/886,265

(22) Filed: May 28, 2020

(65) Prior Publication Data
US 2020/0293160 A1 Sep. 17, 2020

Related U.S. Application Data

(63) Continuation-in-part of application No. PCT/TR2018/050742, filed on Nov. 28, 2018.
(Continued)

(51) Int. Cl.
*G06F 16/955* (2019.01)
*G06F 16/953* (2019.01)
(Continued)

(52) U.S. Cl.
CPC ........ *G06F 16/9558* (2019.01); *G06F 3/0482* (2013.01); *G06F 16/953* (2019.01); *G06F 16/958* (2019.01); *G06F 40/169* (2020.01)

(58) Field of Classification Search
CPC .. G06F 16/9558; G06F 3/0482; G06F 16/953; G06F 16/958; G06F 40/169
See application file for complete search history.

(56) References Cited

U.S. PATENT DOCUMENTS

| 6,877,137 | B1 | 4/2005 | Rivette et al. | |
|---|---|---|---|---|
| 8,713,438 | B1 * | 4/2014 | Broniek | G06F 40/169 |
| | | | | 715/764 |

(Continued)

OTHER PUBLICATIONS

International Search Report and Written Opinion, dated May 13, 2019, pp. 1-12, issued in International Application No. PCT/TR2018/050742, European Patent Office, Rijswijk, The Netherlands.
(Continued)

*Primary Examiner* — Justin R. Blaufeld
(74) *Attorney, Agent, or Firm* — Crowell & Moring LLP

(57) ABSTRACT

A web resource interaction system includes a computer implemented method, a computer system, and a non-transitory computer readable medium to provide an infrastructure that enables a controlled interaction environment on web resources, where the system continuously and dynamically adapts itself to the contextual and/or structural alterations of web resources, while controlling the objects to be interacted, e.g. according to their roles, and/or interrelationship, and/or predefined features introduced to the system. Thus, within the scope of any data network including the Internet, the web resource interaction system provides an infrastructure that enables a steady and consistent interaction environment, where human and machine users may interact with web resources by adding—and/or reaching to—virtually any kind of user generated content and/or user generated software application—stored and executed by the system—, or interact with each other through user generated contents and/or user generated software applications that act as network links.

24 Claims, 10 Drawing Sheets

Related U.S. Application Data

(60) Provisional application No. 62/591,750, filed on Nov. 28, 2017.

(51) Int. Cl.
    *G06F 3/0482*     (2013.01)
    *G06F 16/958*     (2019.01)
    *G06F 40/169*     (2020.01)

(56) References Cited

U.S. PATENT DOCUMENTS

| | | | |
|---|---|---|---|
| 2004/0001093 A1* | 1/2004 | Sellers | G06F 40/103 715/766 |
| 2004/0205545 A1* | 10/2004 | Bargeron | G06F 40/169 715/205 |
| 2004/0261016 A1* | 12/2004 | Glass | H04L 51/212 715/230 |
| 2005/0091027 A1* | 4/2005 | Zaher | G06F 40/169 703/22 |
| 2007/0174762 A1* | 7/2007 | Plant | G06F 40/169 715/205 |
| 2008/0119235 A1* | 5/2008 | Nielsen | G06F 3/04883 455/566 |
| 2009/0254540 A1* | 10/2009 | Musgrove | G06F 16/31 707/999.005 |
| 2010/0070845 A1* | 3/2010 | Facemire | G06F 40/169 715/753 |
| 2011/0258526 A1* | 10/2011 | Supakkul | G06F 40/169 715/230 |
| 2012/0144286 A1* | 6/2012 | Bank | G06F 3/0308 715/230 |
| 2012/0191728 A1* | 7/2012 | Libin | G06F 16/9562 707/769 |
| 2014/0115441 A1* | 4/2014 | Badoiu | G06F 40/169 715/230 |
| 2014/0344658 A1* | 11/2014 | Srinivasan | G06F 40/134 715/205 |
| 2014/0380142 A1* | 12/2014 | Mikutel | G06F 9/451 715/234 |
| 2015/0186350 A1* | 7/2015 | Hicks | G06F 3/04842 715/230 |
| 2015/0278180 A1* | 10/2015 | Nicholas, Jr. | G06F 3/04883 715/230 |
| 2017/0006349 A1* | 1/2017 | Song | H04N 21/6379 |
| 2018/0173381 A1* | 6/2018 | Bakker | G06F 9/543 |
| 2019/0147026 A1* | 5/2019 | Jon | G06F 40/171 715/230 |
| 2019/0294660 A1* | 9/2019 | DeVoe | G06F 40/169 |
| 2020/0073903 A1* | 3/2020 | Jain | G06F 16/9558 |

OTHER PUBLICATIONS

Kahan, J. et al., "Annotea: an open RDF infrastructure for shared Web annotations," dated Aug. 5, 2002, pp. 589-608, Computer Networks, Elsevier, Amsterdam, The Netherlands, XP004369434.

Glover, I. et al., "Online annotation—Research and practices," dated Aug. 23, 2007, pp. 1308-1320, Computers & Education, vol. 49, No. 4., Pergamon, Amsterdam, The Netherlands, XP022208849.

* cited by examiner

# SYSTEM FOR SUPERIMPOSED COMMUNICATION BY OBJECT ORIENTED RESOURCE MANIPULATION ON A DATA NETWORK

RELATED APPLICATIONS

The present patent document is a continuation-in-part of International Application No. PCT/TR2018/050742 filed Nov. 28, 2018, which takes priority from U.S. Provisional Patent Application No. 62/591,750 filed Nov. 28, 2017, both of which are hereby incorporated by reference.

TECHNICAL FIELD

This disclosure relates generally to web resources and more particularly to a system for providing an interactive communication medium on existing web resources.

BACKGROUND

The growth of Internet in the last decade has also seen an exponential growth of websites related to different areas. There are news websites, e.g. BBC.com™, CNN.com™, social networking websites, e.g. Facebook.com™, Twitter-com™, e-commerce websites, e.g. Amazon.com™, Alibaba.com™, official websites such as corporate, institutional or governmental websites, e.g. Shell.com™, Whitehouse.gov, Un.org.

Currently the majority of the official websites do not allow user interaction at their web pages. For example, almost none of the corporate, institutional or governmental websites allow the publication of comments or any form of user content input. Moreover, there are major news websites that fall into this category such as BBC.com™. On the other hand, while other websites such as social networking websites or e-commerce websites allow user interaction, they may have technical limitations on publication of user content inputs such as number of characters or time lag and/or they may have administrative limitations such as requiring an exclusive membership for providing comments. Further, user interaction may be controlled by moderation or censorship in accordance with the interests of the websites.

In addition, currently comments are presented at the lower end of user interfaces. In this presentation format the comments are typically ignored by a web page viewer, and it is also confusing when a web page includes such comments on multiple topics. Further, meaningful data, such as comments provided by a user on web pages, cannot be collected or compiled in the current format.

SUMMARY

The web resource interaction system described herein includes a computer implemented method, a computer system, and a non-transitory computer readable medium to superimpose user generated contents and/or user generated software apps—that are stored and executed by the system—on web resources (e.g. web pages) of a data network. 'Superimposing' is defined herein as the combined process of associating user generated contents and/or user generated software apps with visual elements and/or clusters of visual elements of a web page, identifying and marking visual elements and/or clusters of visual elements that are associated with user generated contents and/or user generated software apps, displaying metadata of user generated contents and/or user generated software apps in connection with the corresponding visual elements and/or clusters of visual elements, and displaying user generated contents and/or executing user generated software apps. In this context, 'superimposed communication' is defined herein as communication based on superimposing, and 'superimposed networking' is defined herein as the social networking based on superimposing. The system includes embodiments that virtually manipulate web resources (e.g. web pages) on a data network, and provide a communication infrastructure, which coordinates superimposed resources (i.e. user generated contents and/or user generated software apps that are associated with visual elements and/or clusters of visual elements) with conventional web resources, where superimposed resources may be created by human users and/or machine users, and/or by the system itself.

The computer implemented method including: i) Analyzing a web page that a user is viewing, and identifying each visual element. For each visual element, generating a uniform visual element identifier (UVEI) that includes distinctive information about content—if any—, information about distinctive properties—if any—, and exact location information of the corresponding visual element. Based on the analysis, ii) identifying the role of each visual element based on a subjective function type (SFT) categorization of visual elements, as, for example, main content, side content and auxiliary element, and for each visual element, identifying cluster information (CI) of interrelated visual elements based on positional and/or functional relationships of the visual elements. Based on the identified role of each visual element, and their interrelationship, iii) filtering visual elements for interaction according to a predefined filtering criteria, such as only main content, only side content, only auxiliary elements, or any combination thereof (such as for user generated contents), and/or as dusters of interrelated visual dements according to their 'positional', or 'positional and functional' relationships (such as for user generated software apps), and enabling filtered visual elements for interaction and disabling the remaining visual dements. Based on the filtered visual dements, iv) indicating visual elements that are available for interaction with a visual indicator for user selection, and based on the user's selection, associating user generated contents and/or user generated software apps with visual dements, by generating a database record based on the uniform visual dement identifiers (UVEI) of interacted visual elements. Based on the generated uniform visual dement identifiers (UVEI) of the rendered web page, v) querying a database for records of user generated contents and/or user generated software apps that are involving visual elements of the web page by comparing content information (CI'), and/or properties information (PI), and/or location information (LI) of each visual dement with the database records of said user generated contents and/or user generated software apps, and based on the query of the database, identifying visual dements that are associated with user generated contents and/or user generated software apps, and visually marking the identified visual dements for selection by a user. Based on receipt of a user's selection, vi) displaying metadata and content of user generated contents, and executing user generated software apps. The computer implemented method further including vii) connecting system users with each other through interactive user generated contents and/or user generated software apps that act as network links on web pages.

The computer system includes a memory storing instructions and a processor configured to execute the instructions. The instructions stored in memory including instruction executable to cause the processor to perform: i) Analyzing a web page that a user is viewing, and identifying each visual element. For each visual element, generating a uniform visual element identifier (MEI) that includes distinctive information about content—if any—, information about distinctive properties—if any—, and exact location information of the corresponding visual element. Based on the analysis, ii) identifying the role of each visual element based on a subjective function type (SFT) categorization of visual elements, as, for example, main content, side content and auxiliary element, and for each visual element, identifying cluster information (CI) of interrelated visual elements based on positional and/or functional relationships of the visual elements. Based on the identified role of each visual element, and their interrelationship, iii) filtering visual elements for interaction according to a predefined filtering criteria, such as only main content, only side content, only auxiliary elements, or any combination thereof (such as for user generated contents), and/or as clusters of interrelated visual elements according to their 'positional', or 'positional and functional' relationships (such as for user generated software apps), and enabling filtered visual elements for interaction and disabling the remaining visual elements. Based on the filtered visual elements, iv) indicating visual elements that are available for interaction with a visual indicator for user selection, and based on receipt of selection by a user, associating user generated contents and/or user generated software apps with visual elements, by generating a database record based on the uniform visual element identifiers (UVEI) of interacted visual elements. Based on the generated uniform visual element identifiers (UVEI) of the rendered web page, v) querying a database for records of user generated contents and/or user generated software apps that are involving visual elements of the web page by comparing content information (CI'), and/or properties information (PI), and/or location information (LI) of each visual element with the database records of said user generated contents and/or user generated software apps. Based on the query of the database, identifying visual elements that are associated with user generated contents and/or user generated software apps, and visually marking the identified visual elements for selection by a user. Based on receipt of a selection by a user of an identified visual element, vi) displaying metadata and content of user generated contents, and executing user generated software apps. The instructions also executable to cause the processor to perform; vii) connecting system users with each other through interactive user generated contents and/or user generated software apps that act as network links on web pages.

The non-transitory computer readable medium storing program code for: i) Analyzing a web page that a user is viewing, and identifying each visual element; for each visual element, generating a uniform visual element identifier (UVEI) that includes distinctive information about content—if any—, information about distinctive properties—if any—, and exact location information of the corresponding visual element. Based on the analysis, ii) identifying the role of each visual element based on a subjective function type (SFT) categorization of visual elements as, for example, main content, side content and auxiliary element, and for each visual element, identifying cluster information (CI) of the interrelated visual elements based on positional and/or functional relationships of visual elements. Based on the identified role of each visual element, and their interrelationship, iii) filtering visual elements for interaction according to a predefined filtering criteria, such as only main content, only side content, only auxiliary elements, or any combination thereof (such as for user generated contents), and/or as clusters of interrelated visual elements according to their 'positional', or 'positional and functional' relationships (such as for user generated software apps), and enabling filtered visual elements for interaction and disabling the remaining visual elements. Based on the filtered visual elements enabled for interaction, iv) indicating visual elements that are available for interaction with a visual indicator for selection by a user, and based on receipt of a selection by a user, associating user generated contents and/or user generated software apps with visual elements, by generating a database record based on uniform visual element identifiers (UVEI) of interacted visual elements. Based on the generated uniform visual element identifiers (UVEI) of the rendered web page, v) querying a database for records of user generated contents and/or user generated software apps that are involving visual elements of the web page by comparing content information (CI'), and/or properties information (PI), and/or location information (LI) of each visual element with the database records of said user generated contents and/or user generated software apps. Based on the query of the database, identifying visual elements that are associated with user generated contents and/or user generated software apps, and visually marking them for user's selection. Based on the user's selection, vi) displaying metadata and content of user generated contents, and executing user generated software apps. The program code may also be for: vii) Connecting system users with each other through interactive user generated contents and/or user generated software apps that act as network links on web pages.

Some interesting features of the web resource interaction system include: Within the scope of any data network including the Internet, embodiments provide an infrastructure that enables a controlled interaction environment on web resources, where the system continuously and dynamically adapts to the contextual and/or structural alterations of web resources, while controlling the objects to be interacted, e.g. according to their roles in web resources, and/or interrelationship, and/or predefined features introduced to the system. Thus, embodiments of the system provide an infrastructure that enables a steady and consistent interaction environment, where human and machine users may interact with web resources by adding—and/or reaching to—virtually any kind of user generated content and/or user generated software app, or interact with each other through user generated contents and/or user generated software apps that act as network links. The current disclosure therefore offers a new communication medium where system users may build a web on the Web, while improving or integrating the services of websites, or challenging the information right at the source without technical and/or structural limitations or limitations imposed through administrative regulations, such as membership requirements, permissions, moderation or censorship.

DETAILED DESCRIPTION

Figure 1:
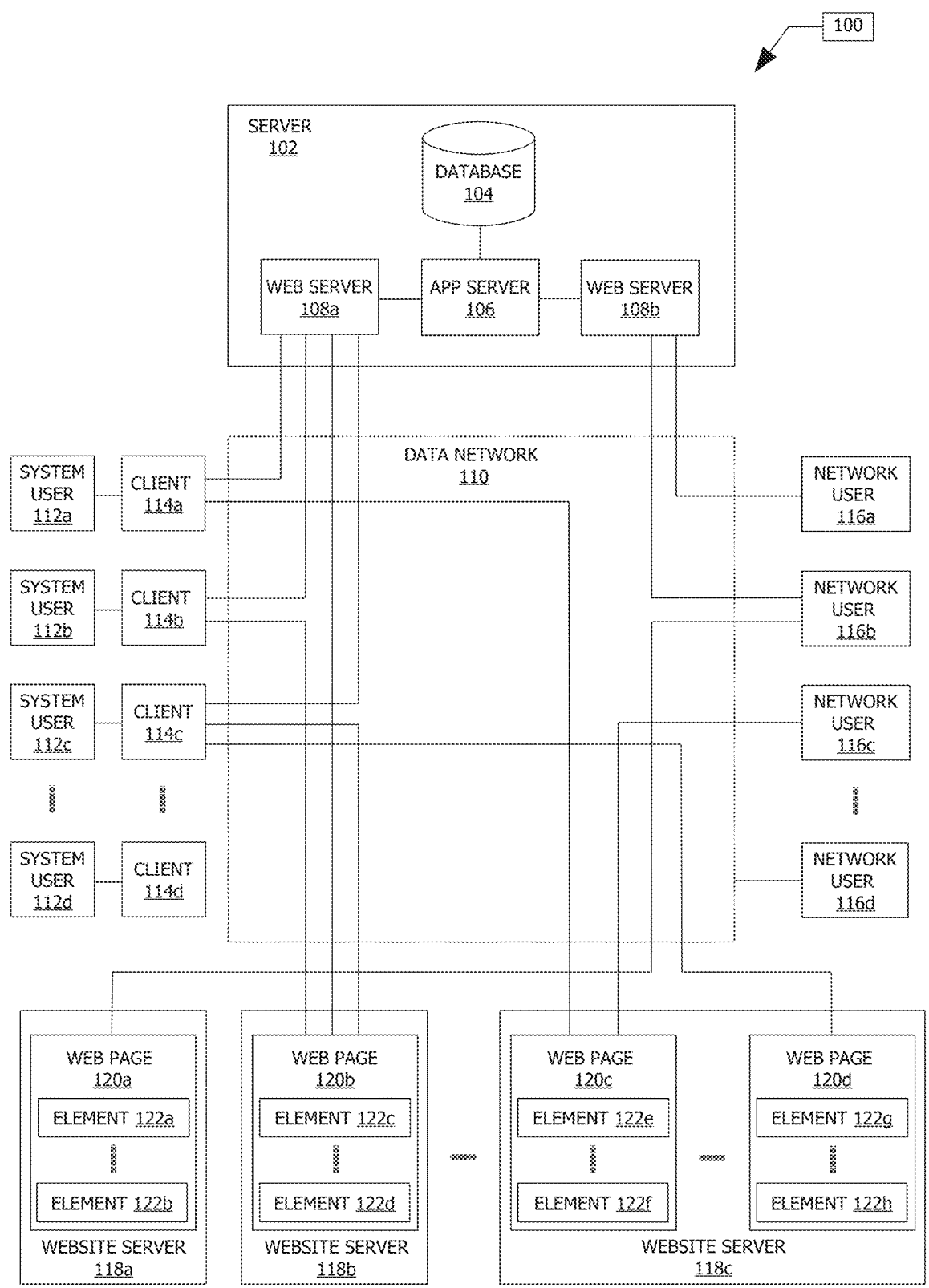
FIG. 1 is a high-level architecture of an exemplary system, according to an embodiment.

The web resource interaction system provides methods and systems that enable users; i) to interact with web resources (e.g. web pages) by associating user generated contents and/or user generated software apps that are stored and executed by the system, with objects of web resources; iii) to reach user generated contents and/or user generated software apps that are associated with objects of web resources; iii) to interact with user generated contents and/or user generated software apps that are associated with objects of web resources; iv) to interact with other users through user generated contents and/or user generated software apps that are associated with objects of web resources on a data network. Furthermore, embodiments provide methods and systems that enable; i) reinforcing the associations against contextual and/or structural alterations of web resources; iii) controlling interaction based on role detection and/or clustering of interrelated elements of web resources.

Regarding the terms and abbreviations that are created and used in the subject matter; 'User generated content' and 'user generated software app' are user content input referred to hereinafter as 'user content input', and user content inputs are user generated contents or user generated software apps; 'Input metadata' or 'IMD' is metadata of the corresponding user content input. Input marker or 'IM' is a visual/audial indicator that indicates the presence of one or more user content inputs that are associated with the corresponding visual element or cluster of visual elements. The term 'contextual' is used in the meaning of 'contentwise', or 'related to content', 'about content', etc. An 'interacted visual element' or 'previously interacted visual element' is a 'visual element that is associated with one or more user content input'. In this context, said interactions should not be confused with web page activity such as detecting a pointing device input on a visual element field, clicking a button with the pointing device, operating a pull down menu, and/or other operations by a user on a rendered web page and/or visual element that do not involve user generated input.

According to embodiments, a virtual super-layer for communication including networking ability on existing web resources of a data network is provided by using visual objects of web resources as landmarks (reference points) for locating/associating user content inputs. Visual objects are objects on a web page that form the structure of the web page. According to Kudělka M at al (2010); Visual objects are independent in their content, have an ability to be classified in the meaning of their purpose, and identifiable in terms of labelling a certain physical part of the web page. Visual objects carry some information to a user and as a whole perform certain functions. A visual object generally performs one or more of 4 basic functions: A visual object may be i) informative (e.g. may provide some basic semantic content to users), ii) navigational (e.g. may have a hyperlink to guide users to another object), interactive (e.g. may have an interactive tool for users to communicate with the system), iv) decorative (e.g. may include elements for beautifying a page), (Ref: Kudělka M at al (2010) Visual Similarity of Web Pages. In: AINSC volume 67, Springer.) A visual object is essentially either a visual element or a cluster of interrelated visual elements, which are the visual building blocks of a web page, and any visual element of a web page may be used as a landmark or reference for locating/associating user content inputs.

Visual elements are defined to facilitate the description of the systems and methods of the current subject matter. According to embodiments, a visual element is an elementary visual field that includes 'content' and 'visual aspects' of a web page element. For example, in the case of rendering hypertext markup language (HTML) and cascading style sheets (CSS), when laying out a document (i.e. web page), the browser's rendering engine may represent each HTML element as a rectangular box according to the standard CSS basic box model. While 'HTML element' provides the content, CSS determines the position and properties (size, border size, background color, etc.) of these example boxes. In principle, each CSS box (i.e. visual element field) with its content (i.e. content of visual element) is a visual building block (i.e. visual element) of a web page.

Accordingly, every HTML element may correspond to a visual element, which may be a—singular—CSS box (i.e. visual element field) that includes the content of the corresponding HTML element (e.g. English text, markup text, hyperlink, image, audio, video etc.). Further, the same may apply for other markup languages supporting CSS, such as XHTML, XML, XUL, SVG, etc. Regarding the positioning of visual elements; In a web page, a visual element may have a fixed location or may be located relative to other visual elements. For example, a cluster of interrelated visual elements (e.g. a GUI object) may be located in a framing visual element, and that framing visual element may be located relative to another visual element (e.g. container of the header). In the case of rendering HTML and CSS, the layout of a web page may be specified by CSS. A rendering engine may interpret each style sheet, and calculate precise graphical coordinates of CSS boxes (i.e. visual element fields) for the visual representation. To elaborate on the characteristics of a visual element; According to the embodiments, content of a visual element may be textual, or visual, or audial, or combinations thereof. Alternatively, or in addition, a visual element may include no content at all, i.e. a visual element with null content.

A content may be included to a visual element by various methods, for example by transclusion, i.e. inclusion of the content by reference, or embedding the raw data of the content into markup. Textual content of a visual element is character content that may be: i) text for humans (e.g. a paragraph of an article), and/or ii) text for machines (e.g. markup/script). Visual content of a visual element is any visual content excluding text (e.g. an image, an image sequence, a video without sound, etc.). Audial content of a visual element is any audial content (e.g. an audio file, a radio stream, etc.). A visual element may simultaneously contain textual, visual, and audial contents individually (e.g. a visual element may contain an image, an embedded invisible hyperlink, and a text simultaneously), or a visual element ray contain textual, visual and audial contents in a single pack (e.g. a single multimedia file containing text, audios, images, animations, videos, etc.). On the other hand, although a visual element with null content has no content at all, its field (i.e. visual element field) has properties such as, size and shape of the field, color and thickness of the border, color of the background fill, etc. Note1: Although a textual content can be physically classified as a visual content, it is separated for clarity and simplicity. Note2: Besides the standard visual and audial interfaces, a computer system may also involve special interfaces such as, haptic or olfactive interfaces, and accordingly a visual element may also include other types of content according to data to be decoded.

The web resource interaction system is not limited with the use of visual elements as landmarks/references. Embodiments may use any element of a web page as a landmark/reference for locating/associating user content inputs. However, to provide a steady, object-oriented communication platform focusing on a user's interaction with perceivable information, example embodiments described herein mainly use visual elements and/or clusters of visual elements as landmarks/references for locating/associating user content inputs.

The web resource interaction system may filter and/or group visual elements for interaction, and similarly, may filter and/or group visual elements in order to disable such visual elements from interaction, wherein filtering is based on role identification of each visual element, and grouping is based on identification of each interrelated visual element group. To elaborate on the technical purpose of this feature; Web pages may contain hundreds of visual elements with thousands of combinations of them, and in case of an infinite scrolling web page, there can be infinitely many visual elements and infinitely many combinations. In addition, content, structure and layout of web pages may change over time, and a significant portion of visual elements or their clusters may be altered with these changes. Moreover, these alterations may happen very often and suddenly in dynamic web pages.

As a result, manual selection of visual elements for interaction, i.e. enabling interaction without any automated filtering and grouping mechanism, involves several technical disadvantages such as: i) creating an unsteady system that is more prone to loss of associations by the alterations of web pages, while creating extra data processing load especially at the identification phase of interacted visual elements; ii) creating an unsteady system, where users (human or machine) may make erroneous selections during the selection process of visual elements and/or visual element groups that they may associate their user content inputs with (e.g. associating user content inputs with irrelevant elements such as, search fields, containers, buttons, scrollbars, or combinations thereof etc.); iii) creating a vulnerable system, where users (human or machine) may create superfluous associations with random, irrelevant visual elements, e.g. by increasing the data processing and storage load of the system, and/or making web pages unusable due to complex, cluttered display. In addition to these disadvantages, enforcing and manipulating users (human or machine) to interact with content according to their roles and/or features and/or functions may be a requirement depending on the type of implementation. For example, there may be need to focus on contextual information or subject matter of web pages (e.g. news items, articles, comments, link previews, videos, social media posts, etc.).

Alternatively, or in addition, there may be need to associate software applications that are stored and executed by the system with interrelated visual element groups with certain functions such as, individual social media posts, etc., where the apps serve within the defined cluster of interrelated visual elements. In general, the benefit of interacting with temporary ads or other extraneous content, or with elements of user interfaces, such as search fields, buttons, scrollbars, icons, containers, etc., may be questionable as well. Consequently, identifying and filtering particular visual elements for interaction, and/or identifying and grouping interrelated visual elements may be a necessity in terms of applicability, effectivity and feasibility.

The web resource interaction system may provide a virtual super-layer for communication including social networking ability. In embodiments, the system connects system users with each other through user content inputs, and user content inputs act as network links. In this scenario, a system user may connect to the publisher/creator (e.g. author) of a user content input through the corresponding user content input via particular interfaces. For example, a user who is an author may have a unique user identifier stored in the database record of his/her user content input, which is associated with one or more visual element/s of a web page, such that rendering of the web page displays the user identifier as available to another user who may provide a connection request to the web page (e.g. through a system's user interface displayed on the web page) to initiate communication (e.g. P2P communication). Furthermore, system users may connect with each other through user content inputs. For example, they may communicate through commenting, messaging, reacting interfaces deployed on user content inputs, while adding some of the authors of the user content inputs and/or commenters on the user content inputs to their follow list or friends list. Therefore, system users may set up an overlay social network on web pages and connect with each other across the data network that the web resource interaction system is included in. Furthermore, a user content input may be accessible to all users or may be restricted for use by a closed subgroup only, thus, subgroups may be formed. The process of setting up an overlay social network on web pages is hereinafter referred to as superimposed networking.

A detailed description of the web resource interaction system is presented through various examples, description and embodiments provided herein. According to various embodiments, the system includes a browser-based application at the client-side, that works in collaboration with an application server and a database server at the server-side. Client-side application, i.e. the client, in collaboration with the server-side application, i.e. the server, may perform processes within the system for enabling interaction of users with elements of web pages and/or user content inputs and/or with each other, on a data network. As described herein, FIGS. 2-5 provide respective example flow diagrams 200, 300, 400 and 500, which are configured to minimize the data processing load of the client-side, while maximizing the data processing load of the server-side. In other examples, other configurations are possible regarding the allocation of the processing load between client-side and server-side, including maximizing the processing load of the client-side, and minimizing the processing load of the server-side.

FIG. 1 is a high-level architecture of an exemplary web resource interaction system 100. The system 100 shown is a configuration for illustrating the functionality with exemplary components and architecture. One of ordinary skill in the art will appreciate that the system may include other features, components and/or modules to illustrate the functionality described herein and is not limited to the components and architecture illustrated in FIG. 1.

The server 102 of the system 100 includes—or has access to—the database 104 (including the database server), the application server 106, and two separate web servers 108a and 108b. The data network 110 may include gateways, routers, other servers and clients, etc. which are not shown. The system 100 includes N number of system users (112a, 112b, 112c, 112d) and their clients (114a, 114b, 114c, 114d), respectively. For example, the client 114a is the client of the system user 112a. The system 100 also includes a plurality of network users. Four of the M number of network users (116a, 116b, 116c, 116d) are shown in FIG. 1. A network user may refer to a data network user who is not a system user. According to various embodiments, a system user is also a network user, but a network user is not a system user. The system 100 include a plurality of website servers. Three of the K number of website servers (118a, 118b, 118c) are connected to the network 110 are shown in FIG. 1. The website server 118a is shown with a first web page 120a, which also includes L number of visual elements. Two of the L number of visual elements are shown as 122a and 122b. The website server 118b is shown with a second web page 120b, which also includes H number of visual elements. Two of the H number of visual elements are shown as 122c and 122d. The website server 118c may be a server of a social media network (e.g. Facebook, Twitter, Instagram, etc.). The website server 118c may store P number of web pages including a third web page 120c and a fourth web page 120d. Web pages 120c and 120d may be social media user pages which include various visual elements. Four of the W number of visual elements are shown as 122e, 122f, 122g and 122h. Clients 114a to 114d are uniform client-side applications working on the web browsers of the system users 112a to 112d, in collaboration with the server-side application, i.e. the application server 106. Web servers 108a and 108b are connection ports of the server 102 to the data network 110. The web server 108a is dedicated for the system users (clients), while the web server 108b is dedicated for the network users. In addition to these, all user content inputs of the system 100 also have their own accessible conventional web pages (not shown). Network users may reach to these web pages, if there is no restriction put in place by the system user who created the associated user content input. System users also have accessible home pages within the system 100, similar to the conventional social media websites where the posts of a system user is listed on a personal home page.

Network user 116a is connected to the server 102. Network user 116a may be browsing web pages containing user content inputs of the system 100, or may be interacting with particular user content inputs of a system user. Network user 116b is connected both to the server 102 and the web page 120a. Network user 116c is connected to the web page 120c only and not related with the system 100. Network user 116d is connected to the network 110 but not connected to the system 100 or any other web page shown.

Client 114a is connected to the server 102 and the web page 120c of the website server 118c. The web page 120c is a social media user page which is open to a closed subgroup only. While the client 114a has permission to reach to the web page 120c, the server 102's access is prohibited. The system 100 scans (probes) the web page 120c indirectly through the client 114a, i.e. the system uses the client 114a as a data link between the server 102 and the web page 120c. Thus, the server 102 may scan the source code of the web page 120c and/or communicate with the website server 118c to retrieve information about hyperlinks and visual elements associated with the web page 120c, such as 122e or 122f.

Client 114b is connected to the server 102 and the web page 120b of the website server 118b. The web page 120b is accessible by any network user including the system users (e.g. a news website). The server 102 is connected directly to the web page 120b known to be unrestricted for all network users with intent to reduce the data transfer load of the client 114b. In this case the system 100 scans (probes) the web page 120b directly. Thus, the server 102 may scan the source code of the web page 120b and/or communicate with the website server 118b to retrieve information about hyperlinks and visual elements associated with the web page 120b, such as 122c and 122d.

Client 114c is connected to the server 102, the web page 120b of the website server 118b, and the web page 120d of the website server 118c. The web page 120d is another user page which is not accessible by all network users. On the other hand, the web page 120b is accessible by any network user including the server 102. While the server 102 is indirectly connected to the restricted web page 120d through the client 114c, it is connected directly to the web page 120b, known to be unrestricted for all network users. Thus, the server may scan the source code of the web pages 120b and 120d and/or communicate with the website servers 118b and 118c to retrieve information about hyperlinks and visual elements 122c, 122d, 122g and 122h associated with the web pages 120b and 120d.

The system user 112d and its client 114d are not connected to the network 110. They are passive members of the system 100.

Within the communication structure of the system 100, and via the execution of the example methods 200, 300, 400 and 500 explained below, system users 112a to 112d may associate user content inputs with the visual elements 122a to 122h of the web pages 120a to 120d, and set up a superimposed social network on the web pages of the data network 110 through user content inputs that act as network links. Similarly, system users 112a to 112d may reach to any user content input that is associated with the objects of web pages of the data network 110. However, a network user who is not a system user may also connect to the system through a client that acts as a proxy server. In one embodiment, one of the clients of the system is used as a proxy server at the system, in which some of the network users, who are not system users, are connected to the system through this client and immediately become system users.

To elaborate the concept of superimposed networking: Any system user, who is connected to the data network 110 via a client, may be interconnected with other system users through the data network 110 via communication protocols (e.g. TCP/IP), and various user interfaces. In this context, user content inputs possessing communication modules and interfaces may connect users with each other for communication, and user content inputs may act as network links of an overlay social network on web pages on a data network. Through the interactive user content inputs, users may interact with each other by commenting, messaging, reacting etc. Further, they may add each other to their friends list, and join each other's social network. Accordingly, each interactive user generated content that is associated with objects of web pages, may become a junction point connecting users.

For brevity, the web server 108a and the application server 106 are together hereinafter referred to as 'server', and the database server with the database 104 are together hereinafter referred to as 'database'.

Figure 2:
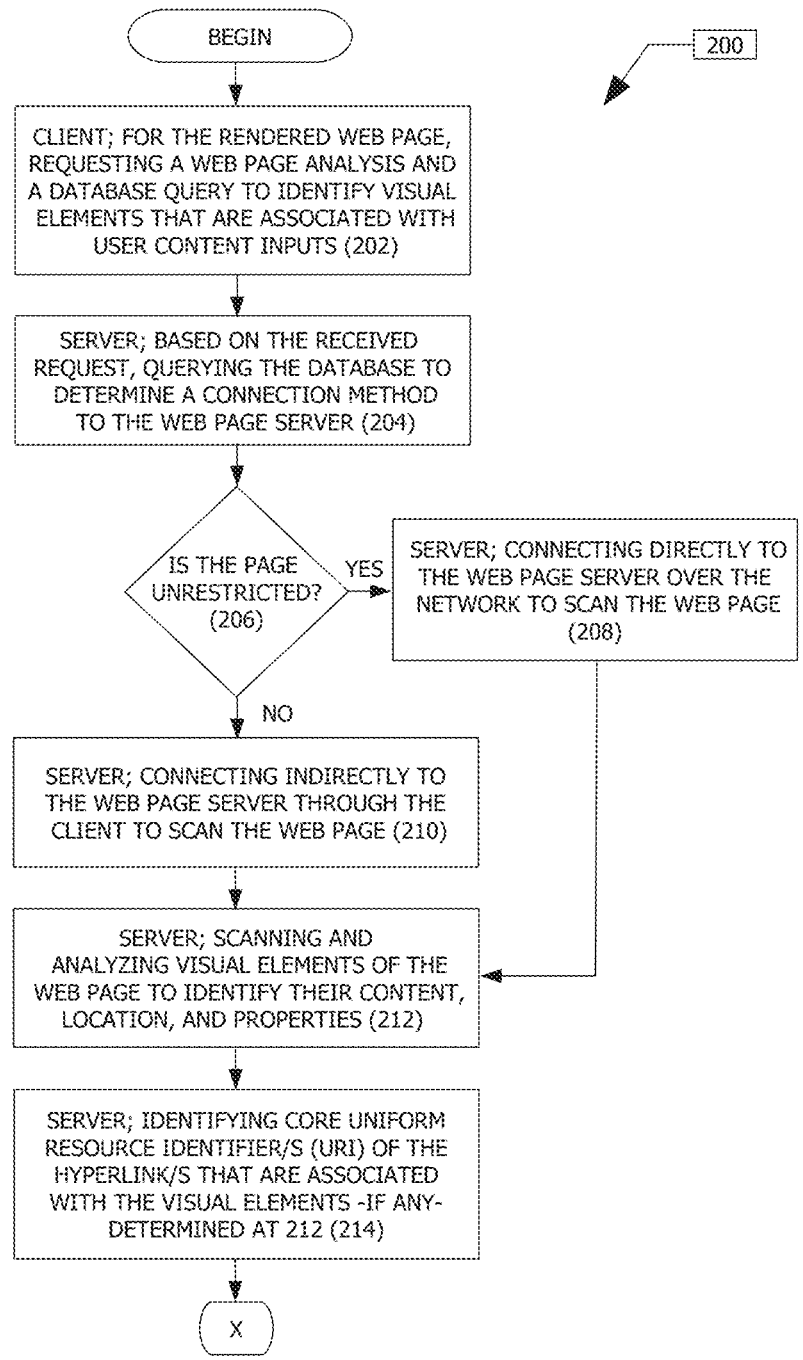
FIG. 2 is a flow diagram illustrating an example process to identify and mark visual elements—of a rendered web page—that are associated with user content inputs.
Figure 2:
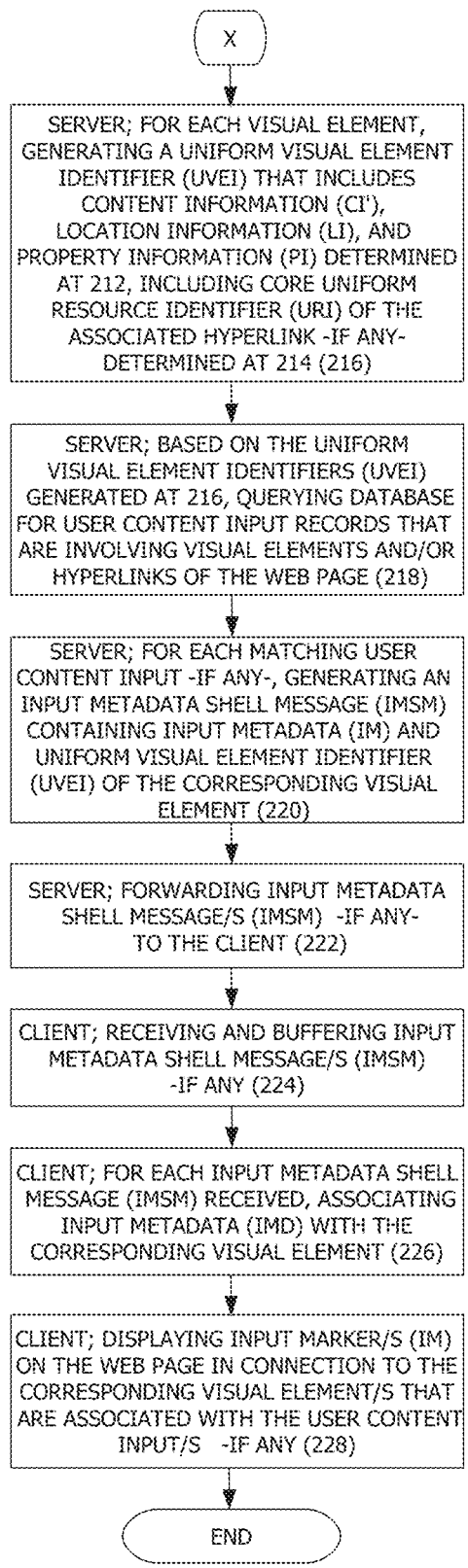

FIG. 2 is a flow diagram 200 illustrating an example process to identify and mark visual elements—of a rendered web page—that are associated with user content inputs.

The process begins with the manifestation/presentation of a web page by the web browser of a system user. At 202, for the rendered web page, the client requests a web page analysis and a database query from the server to identify visual elements that are associated with user content inputs. Next, based on the received request, the server queries the database to determine a connection method in order to communicate with the web page server and scan the web page (204). In some embodiments, the server may connect directly to the target web page over the data network. In yet other embodiments, the server may connect indirectly to the target web page via linking up through the client, i.e. using client as a data link. Indirect connection is always reliable, because server may not have access to the target web page (e.g. the target web page may be a social media user page accessible to a closed sub group only), or may have limited access, or there may be some restrictions for ordinary network users or for the system user itself. On the other hand, for various reasons such as reducing the data transfer load of the system user, the server may directly connect to the web pages known to be unrestricted for all network users (e.g. news websites, government websites, e-commerce websites, etc.). For this purpose, the system may use an URL list of unrestricted websites and may decide between direct or indirect connection by comparing the URL of the target web page with the URLs of the websites, i.e. domain names, in the list. In one embodiment, the server scans the unrestricted website list (UWL) for a match with the URL of the target website (204). Unrestricted website list (UWL), which includes the URLs of the websites that are known to be unrestricted for all network users (e.g. CNN.com, BBC.com, etc.), may be generated and updated manually and/or by software algorithms working under the system.

Next, the server decides the connection method (206). If the target web page is unrestricted then the server connects to the target web page directly over the network to scan the web page directly (208). If the target web page is restricted, then the server connects to the target web page indirectly through the client to scan the web page indirectly (210). According to an embodiment, the server prefers to connect to any web page server indirectly only, because the indirect connection method provides a reliable communication mechanism for all cases, and may be preferred if extra data transfer load of the client is not a concern.

At 212, based on the source code (which may specify the content, layout and structure of the web page, and may define the meaning of each element) and/or any information retrievable from the web page server, the server scans the rendered web page and analyzes each visual element to identify their content, location and properties, in order to generate a visual element identifier. Content of a visual element may be a text, an image, an audio, a video, a hyperlink, an application etc., and the source code may contain the content itself (e.g. a container including a text and a hyperlink) or the identifier/locator of the content for retrieving it from the website server (e.g. a container including an image or a video). Location of a visual element on a web page is the relative position of the visual element according to other visual elements. Properties of a visual element varies, e.g. size, shape, border width, background color, etc. of the visual element field. Content and properties of a visual element are solid references for identification in most of the cases. However, in some cases, location information may be the only reference to identify a visual element since location of a visual element is always distinctive, —as long as content, and/or layout, and/or structure of the web page does not alter in a way to invalidate it. For example, there may be multiple visual elements with identical properties and content. On the other hand, there may be cases where the location itself may not be sufficient to identify a visual element. For example, layout of web page may be changed in time. Accordingly, a visual element of a web page may be identified more accurately by referencing all variables (i.e. content, location and properties) simultaneously, or one of them individually, or in any combination that fits the needs of the application.

Next, the server analyzes the resource identifiers (e.g. URLs) of the hyperlinks that are associated with visual elements—if any—determined at 212, and identifies the core resource identifiers (e.g. core URLs) (214). Core resource identifiers are resource identifiers of hyperlinks isolated from the additional extensions, e.g. subsequently added auxiliary extensions by search engines.

Next, for each visual element, the server generates a uniform visual element identifier (UVEI) that includes distinctive information about content—if any—, exact location information, and information about distinctive properties of the visual element—if any—, for precise identification (216). The server also assigns an ID for each uniform visual element identifier (UVEI) generated. As stated hereinbefore, while 'exact' location information always exists, 'distinctive information' about content and information about 'distinctive properties' of a visual element may or may not exist. In one embodiment, a uniform visual element identifier (UVEI) of a visual element includes: i) The content—itself—, the content type—media type—and the URI of the hyperlink—if any—determined at 212, as the content information (CI'); ii) Resource identifier of the web page (e.g. URL) and relative position information of the visual element on the web page determined at 212, as the location information (LI), iii) Information about the properties of the visual element field determined at 212, as the property information (PI). According to one embodiment uniform visual element identifier (UVEI) may also include core resource identifier (e.g. core URL) of the associated hyperlink isolated at 214. For example, a uniform visual element identifier (UVEI) may include: i) Core URL of the hyperlink K of visual element Z; ii) URL of web page Y of website X, and relative position information of visual element Z on web page Y; iii) Property A and property B of visual element Z. Uniform visual element identifier (UVEI) is similar to URL, which is a reference to a web resource that specifies its location on a data network, and a mechanism for retrieving it. According to various embodiments, uniform visual element identifier (UVEI) is a reference to a visual element that specifies its location on a data network, and a mechanism for retrieving it.

Next, based on the uniform visual element identifiers (UVEI) generated at 216, the server queries the database for user content input records that are involving visual elements and/or hyperlinks—if any—of the web page (218). Thus, the server queries the database for identifying matches between new UVEIs (i.e. nUVEIs) and recorded UVEIs (i.e. rUVEIs) of the user content input records that are including the locator (e.g. URL) of the web page in the rUVEIs, based on various comparison methods such as exact relative position comparison and/or comparison based on similarity analysis of contents. For example, the server may identify interacted visual elements of a web page, which may be represented in the database by previously recorded user content inputs that are associated with the visual elements including hyperlinks of the web page—if any.

In various embodiments, only one visual element is associated with a user content input if the user content input is a user generated content. However, one or more visual elements may be associated with a user content input if the user content input is a user generated software app. In examples of user generated contents, in one embodiment, where the server includes contents partially in the UVEIs as the content information (CI') by a predefined sampling procedure—, for each UVEI generated at 216, the server may execute a similarity comparison between the sampled contents included in the generated UVEIs at 216 and the sampled contents included in the recorded UVEIs of the rendered web page, which may represent interacted visual elements in the rendered web page. In other words, user content input records may be stored to include the UVEIs of interacted visual elements which a user has interacted with to add user content input thereto. Alternatively, or in addition, the server may query database records for a match between the hyperlinks detected at 212 and interacted web pages, i.e. web pages associated with one or more user content inputs. In this process, core URLs of the hyperlinks determined at 214, are compared with the URLs of the interacted web pages recorded in the database.

In examples of user content input in the form of user generated software apps, in various embodiments, the database is also queried according to the cluster information (CI) —that is identified in process 300 according to positional and functional relationship of visual elements—besides the uniform visual element identifiers (UVEI) of the interacted visual elements. In this process, for each record of a user content input associated with the web page, recently obtained cluster information (CI) is compared with the cluster information (CI) (or the portion related with the interacted cluster) that is recorded in the database in process 400. In the process of identifying interacted clusters, cluster information (CI) —along with other information obtained at 300 such as, subjective function type (SFT), etc. —is used as a reference, in order to maintain the associations in case of occurrence of contextual and/or structural alterations in interacted clusters. Process 300, may be executed right after the execution of 216 to generate the UVEIs, thus, following the execution of process 300, process 218 may be executed, according to the embodiments. User generated software apps may also be associated with single or multiple visual elements. However, in example scenarios, user generated software apps may be encountered that are associated with clusters of interrelated visual elements, such as, link previews, social media posts, media players, tables, other predefined clusters etc. more often than single visual elements.

Next, for each matching user content input—if any—, the server generates an input metadata shell message (IMSM) containing input metadata (IMD), i.e. metadata of the user content input stored in the user content input records in the database and uniform visual element identifier/s (nUVEI/s) of the corresponding visual element/s of the rendered web page (220).

Next, the server forwards input metadata shell messages (IMSM) to the client—if any (222). At this phase, no other information about the content of the user content inputs are sent to the client. Thus, the process gains speed by decreasing the data transfer load. According to an embodiment, input metadata (IMD) contains brief information about the associated user content input stored in the user content input records of the database, e.g. publisher, heading, summary, popularity score, rank etc. of the user content input. Next, the client receives and buffers input metadata shell messages (IMSM) —if any (224).

Next, for each input metadata shell message (IMSM) received, the client associates input metadata (IMD) with the corresponding visual element/s of the web page being rendered for the user (226).

Next, the client visually displays input markers (IM) on the web page in connection to the corresponding visual elements and/or clusters of visual elements that are associated with the user content inputs—if any (228). One or more visual elements of the web page associated with the user content inputs may be visually marked to indicate availability of user generated contents for selection by the user. According to various embodiments, user content input markers (IM) may be transparent, miniature, and/or inconspicuous icons marking discrete visual elements and/or clusters of visual elements of the web page in a manner which does not impede the usage of the web page. In one embodiment, the client places input markers (IM) at only certain points within visual element fields, e.g. top right corner of a visual element field. Thus, input markers (IM) may be integrated with the web page's sense of balance and esthetics due to their association with visual element fields. In case of a cluster of interrelated visual elements, —which are identified in the process 300—, the marker may be placed at a predetermined location, such as a top right corner, of the visual element field that is enclosing the group—if any. Else, the client may create a virtual frame that is enclosing the cluster of interrelated visual elements and mark it by the same way. Moreover, appearance of the input markers (IM) in an embodiment may vary and particular input markers (IM) may be used for particular user content inputs. For example, in embodiments, while ordinary user comments that are associated with a visual element are marked with a circular input marker (IM), expert user comments associated with the same visual element are marked with a triangular input marker (IM) separately. Regarding the method of manipulation, client may change the source code of a page to include markings, or the browser may be programmed to mark the relevant positions without changing the source code. In case of HTML, the client may utilize DOM (Document Object Model) of the web page to manipulate the web page without changing the source code.

The process terminates after the execution of 228, unless the page is an infinite scrolling web page. In case of an infinite scrolling web page, for every additional manifestation of the web page the process loops between 212 to 228, i.e. all sub processes are executed in sequential order starting at 212 and ending at 228. As a result of the process 200, the client, in collaboration with the server, identifies and marks visual elements and/or clusters of visual elements that are associated with user content inputs—if any—, according to an embodiment.

To elaborate on the procedures to identify visual elements and the function of uniform visual element identifier (UVEI), primary identification processes are listed: According to the embodiments, there may be two phases of identifying visual elements, and whenever a web page is rendered by a browser of a client, these procedures may be executed specifically for that client: Phase 1) 'Analyzing a web page that a user is viewing, and identifying each visual element; for each visual element, generating a uniform visual element identifier (UVEI) that includes distinctive information about content—if any—, information about distinctive properties—if any—, and exact relative location information of the corresponding visual element (e.g. with respect to neighboring visual elements). An UVEI identified in the phase 1 may also be called as 'new UVEI' or 'nUVEI', which is a temporary reference of a visual element particular to the viewing session of a rendered web page of a client. An nUVEI becomes a recorded UVEI (i.e. rUVEI) and becomes stationary, if it is recorded in the database (e.g. in a field of a user content input record) to associate a user content input with the corresponding visual element. Phase 2) 'Based on uniform visual element identifiers (UVEIs) of visual elements identified in phase 1 (i.e. nUVEIs), i) identifying visual elements that were previously interacted by comparing nUVEIs with rUVEIs stored in the database, and/or identifying role/s of each visual elements and/or iii) identifying clusters of interrelated visual elements, and/or iv) identifying visual elements that are available for interaction. According to the embodiments, for each visual element, a uniform visual element identifier (UVEI) is generated in each viewing session of a client, because a stable reference—independent of source code dictated by website servers—is required, since content, and/or layout and/or structure of a web page (i.e. source code) may be altered—manually (e.g. by website admins) and/or automatically (e.g. by executing scripts/programs) —in progress of time, and such alterations may result in loss of association between the interacted visual elements and their corresponding user content inputs associated therewith and stored in the database records.

For example, element attributes may be changed in such a way that alteration invalidates a locator strategy. Accordingly, methods such as anchoring based on element IDs, or executing conventional fragment identification systems, may not work properly. Moreover, alterations can be done deliberately to jam such systems by more advanced procedures. For example, content of some visual elements of a web page may be altered in such a way that altered content (e.g. pictures, videos, etc.) may be identifiable only by the detailed analysis of the content itself. Consequently, any system depending on the identification of interacted visual elements based on source code of web pages is inevitably prone to loss of associations or false associations between the time the interacted web page elements are established, and corresponding user inputs are received. For example, associations may be lost, or user content inputs may be associated with irrelevant visual elements. In principle, the UVEI serves as a stable reference to maintain that association by holding/containing any possible distinctive information about content and properties, and exact relative location information of each visual element with respect to other visual elements. Thus, the UVEI creates a base for various locating/identifying strategies and procedures.

To elaborate on the subject of distinctive information about content of a visual element; According to the embodiments, distinctive information about content of a visual element may be the type of the content (e.g. media type), and/or general properties of the content (e.g. type, size, etc.), and/or the content itself, —and which can be considered a reliable reference for most of the cases if the extra data processing load is not a concern. Accordingly, a uniform visual element identifier (UVEI) of a visual element may include the content—of the visual element—itself partially or wholly as a reference for comparison. For example, if the content of a visual element is a text, a hyperlink, a script, or an image, then it may be included in UVEI directly. For larger files (e.g. audio or video files) where the data processing load may be a concern, general properties of the content (e.g. type, size, etc.) may be used in combination with the properties of the visual element. Furthermore, content—of a visual element—may be included in its UVEI partially, and sampling techniques may be used for estimation/approximation of the content, such as interpolation. On the other hand, not all visual elements do possess distinctive content. For example, in a web page, there may be multiple visual elements with identical content.

To elaborate on the subject of distinctive information about the properties of a visual element; According to the embodiments, distinctive information about properties of a visual element may be any property (e.g. shape, size, background, padding, border, margin size, etc.) of the visual element that are unique among all visual elements of a web page (e.g. a unique background color, size, font, etc.). For example, the size of a canvas element of a web page is a distinctive property for most of the cases since it contains all visual elements of a web page. On the other hand, not all visual elements possess distinctive properties. For example, in a web page, there may be multiple visual elements with identical properties. In the case of CSS, properties of a visual element field is as follows: animation properties, background properties, border properties, color properties, dimension properties, generated content properties, flexible box layout properties, font properties, list properties, margin properties, multi-column layout properties, outline properties, padding properties, print properties, table properties, text properties, transform properties, transitions properties, visual formatting properties, etc.

To elaborate on the subject of exact relative location information of a visual element; According to the embodiments, relative location information of a visual element includes position of the visual element relative to other visual elements in a rendered web page, and the URL of the rendered web page that it belongs to. Unlike content and properties of a visual element, location information is always distinctive as long as content and/or structure of the web page does not alter in a way to invalidate it. In one embodiment, positioning rules of visual elements included in the string of exact relative location information of UVEIs are similar to the ones in the style sheets of CSS.

To elaborate on the subject of distinctive information in general; According to the embodiments, distinctive information about content, information about distinctive properties and exact location information that are all included in UVEI may be used in several combinations for associating/identifying interacted visual elements, according to needs. In all cases, 'exact location information' is essential, —even if the relative position of the visual element alters—, since it includes locator (URL) of the web page that the visual element belongs to. On the other hand, there can be special cases where content, properties and relative position information of a visual element—all together—cannot be sufficient to identify the visual element depending on the level of alteration of content, and/or layout and/or structure of a web page. For example, there can be multiple visual elements with identical properties and content in a web page, where relative positions of visual elements alter frequently. Accordingly, maintaining associations in between interacted web page elements and their corresponding user content inputs may not be possible in some special cases.

To elaborate on the possible identifying strategies; According to various embodiments, content of visual elements (which may be stored in the database within a corresponding UVEI generated by the system), may be used partially or wholly (e.g. depending on data size) as the primary reference for locating/identifying visual elements that are interacted, besides (or in addition to) the URL of the web page that the visual elements belong to. In this regard, content of a visual element may be included—partially or wholly—in database records associated with the corresponding UVEI as the distinctive information about content. In embodiments, for associating user content inputs with visual elements, and identifying visual elements that are associated with user content inputs in web pages that are viewed by users; the system collects content fragments from visual elements that include media files, such as images, videos, audios, documents, etc. by appropriate sampling procedures particularly selected according to content properties (e.g. media type, size, format, etc.) of each visual element, and include collected content fragments to the corresponding UVEIs as the distinctive information about content, in order to reduce the data processing load. In this process, for content located in website servers (e.g. documents, videos, audios, or any kind of streaming media) the system fetch data from website servers for sampling (e.g. by sampling the first 'one second' of videos, or by sampling small segments from PDF documents, etc.). When the system queries the database for identifying interacted visual elements of a web page, recently generated UVEIs are compared with the recorded UVEIs of the said web page according to their content type (e.g. video with video, image with image, text file with text file, etc.). In this process, the system compares content fragments with each other according to their similarities, and for each tested pair calculates the similarity rate—or resemblance rate—based on the similarity analysis. If similarity percentage of a pair exceeds a predefined similarity threshold, then the system associates the pair, according to the embodiment. In such embodiments, various statistical similarity measures may be used as a base for similarity analysis of data sets, and various algorithms may be preferred or developed depending on the type of content (e.g. image, audio, video, text, etc.) of visual elements. Furthermore, even semantic similarity comparison may be used in some specific applications.

To elaborate on the subject of analyzing and identifying interacted visual elements, a hypothetical example is provided as following: In one embodiment, a system user SU interacts with a dynamic web page that he/she is viewing, by associating respective user content inputs as APP1, POST1, and POST2, with a text T, which is the content of visual element VE1, with an image P, which is the content of visual element VE2, and with a video V, which is the content of visual element VE3. APP1 which is associated with the VE1 may be a translator program that translates text from one language to another and manipulates the visual element in order to display the translated version of the original text. POST1 and POST2 which are associated with VE2 and VE3 respectively, are social media posts including pictures and ideas of SU about the content of the corresponding visual element. A database record is generated and stored by the system for each user content input APP1, POST1 and POST2, wherein each record contains content information CI', property information PI and relative location information LI of VE1, VE2 and VE3 in their corresponding UVEIs respectively. Properties information PI may be the all available information about the properties of VE1, VE2, and VE3. Image P and text T may be included as a whole to their corresponding database records in their corresponding UVEIs respectively, —due to their relatively small data sizes—, and video V may be included partially (e.g. by collecting samples from the source file of the video, which are fetched from the website server), —due to its relatively large file size—, as content information CI'. In this process, the system associates each post of user content input with the corresponding visual element in a rendered web page by recording the posts with corresponding UVEIs to the database. In the first attempt, the website server alters the layout and structure of the said web page deliberately to jam the system including formal alterations in the source code, such as altering element IDs, content identifiers etc. As a result, relative positions and properties of VE1, VE2 and VE3 becomes altered including corresponding element IDs, content IDs etc., and they become the derivatives DVE1, DVE2, and DVE3 of the original visual elements (except the contents). When SU—or any other system user—views the web page (e.g. when the web page is rendered), the system generates new UVEIs (nUVEIs) of DVE1, DVE2, DVE3 and compares them with the user content input database records involving UVEIs (rUVEIs) that include the URL of the said web page. In this process, the system compares the original text T with other texts, image P with other images and video V with other videos (by comparing sampled fragments) of the web page based on recorded UVEIs (rUVEIs) and recent nUVEIs. Based on the query, recorded UVEIs of VE1, VE2 and VE3, match with the recent nUVEIs of DVE1, DVE2, and DVE3 on content basis with a predetermined similarity level, such as a 100% similarity. Consequently, based on the similarity comparison of the content, the system successfully associates SU's user content inputs with the corresponding visual elements in the rendered web page, and visually marks them. By selection of these markers, SU—or any other system user—may reach to the corresponding metadata. In the second attempt, the website server alters the content of DVE1 by slightly changing the text T (thus becomes T'), alters the content of DVE2 by slightly degrading the image quality of P—by processing the image—(thus becomes P'), and finally modifies DVE3 by transforming the visual element into a dynamic one that alters video content randomly in progress of time from a list that include N number of different videos. In addition to that, the website server also alters the layout and structure of the web page including radical alterations in the source code. As a result, relative positions, properties and contents of DVE1, DVE2 and DVE3 becomes altered and they become the derivatives DDVE1, DDVE2, and DDVE3. When SU—or any other system user—views the web page, the system generates new UVEIs (nUVEIs) of DDVE1, DDVE2, DDVE3 and compares them with the user content input database records involving UVEIs (rUVEIs) that include the URL of the said web page. In this process, the system compares the original text T with other texts, image P with other images and video V with other videos. Based on the query, i) recorded UVEI of VE1, partially match with the recent UVEI of DDVE1, on content basis with X % similarity, ii) recorded UVEI of VE2, partially match with the recent UVEI of DDVE2, on content basis with Y % similarity, iii) recorded UVEI of VE3, does not match with the recent UVEI of DDVE3 initially but thereafter with 100% similarity, based on the comparison of the sampled fragments of video V (included in the UVEI of VE3) with altering video content in any visual element of the web page during the viewing. Consequently, based on the similarity comparison of the content, the system successfully associates SU's user content inputs with the corresponding visual elements and visually marks them, because the similarity rates X and Y exceed the predefined similarity threshold. On the other hand, the system visually marks the dynamic visual element DDVE3 whenever video V is loaded, and deletes the marker whenever video V is altered with another video. By selection of these markers, SU—or any other system user—may reach to the corresponding metadata. In another example, the web page server alters the content of DDVE1 by significantly changing the text T' (thus becomes T''), and alters the content of DDVE2 by significantly degrading the image quality of P' (thus becomes P''). Text T'' and image P'' diverge from originals in such a degree that similarity rates fall below the predefined similarity threshold. Consequently, while keeping the association of visual element DDVE3 with video V, the system terminates the association of visual elements DDDVE1 and DDDVE2 with text T and image P respectively, according to the embodiment.

According to the embodiments, the process of identifying/locating visual elements of web pages does not have to rely on any ID based on the source code of web pages (e.g. utilizing namespaces, etc.). If preferred, uniform visual element identifiers (UVEIs) of visual elements do not include IDs assigned by website servers such as fragment identifiers, content identifiers, etc. Methods and systems presented within the current disclosure include embodiments designed on the basis that source codes of web pages—including any ID assigned by website servers—can be deliberately changed to confuse, and/or damage, and/or jam such systems. Alternatively, or in addition, the web resource interaction system may also include processing IDs based on the source codes and is not limited to the methods presented.

Figure 3:
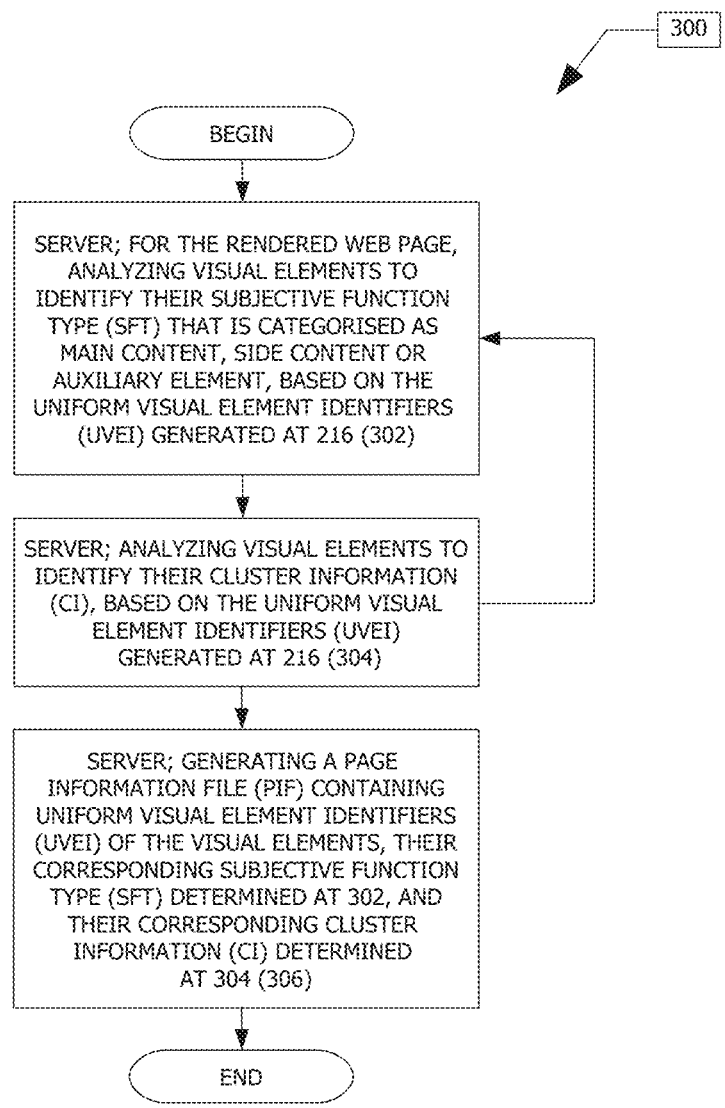
FIG. 3 is a flow diagram illustrating an example process to identify the role of each visual element, and clusters of interrelated visual elements of a rendered web page.

FIG. 3 is the flow diagram 300 illustrating an example process to identify the role of each visual element, and clusters of interrelated visual elements of a rendered web page, according to an embodiment;

The process begins after the execution of 216, in which the server generates a uniform visual element identifier (UVEI) for each visual element of the rendered web page. At 302, for the rendered web page, the server analyzes each visual element to identify their function in the page, via identifying the role of each visual element based on the subjective function type (SFT) categorization of visual elements as main content, side content and auxiliary element. In this context, main content is the main subject of a web page, e.g. the subject matter presented for consideration of the viewers. For example, in a news web page, news articles, news videos, link previews of other news article pages or videos etc. are main contents. Side content is the subaltern subject of a website such as ads, extraneous announcements, or any other extraneous content. Finally, auxiliary element is any visual element without a subjective function. For example, visual elements that are graphic components of GUI elements are auxiliary elements, such as containers—like canvases and frames—, buttons, sliders, text fields, list boxes, icons, navigation links, search boxes, lines, special shapes, etc. are auxiliary elements. Subjective function type (SFT) does not overlap among the visual elements. A visual element is either main content, or side content, or auxiliary element. In embodiments, to identify subjective function type (SFT) of the visual elements of a web page, the server identifies only the side contents and auxiliary elements. The remaining visual elements of the web page fall into the main content category. In this regard, identifying any 2 of the 3 categories is sufficient in order to identify corresponding subjective function type (SFT) of each visual element of a web page.

Next, the server analyzes each visual element to identify cluster information (CI) of visual elements (304). Cluster information (CI) is information about the relationship of a visual element with other visual elements in a rendered web page, and used as a reference to group interrelated visual elements of the rendered web page. For example, a group of visual elements within a framing visual element (e.g. a container) are identified as interrelated visual elements. Moreover, by frames within frames, or groups within groups, cluster information may also include ranks of inter-relationship. For example, a search field and a search button lined up next to each other may be a first order cluster, while the entire navigation bar containing them besides some link buttons may be a second order cluster. In this context, the highest rank of interrelationship may correspond to all visual elements of the web page framed/enclosed by the canvas, i.e. the web page itself. According to the embodiments, analysis of visual elements to identify cluster information (CI) is based on relative positional relationship of visual elements (e.g. a group of visual elements that is framed by another visual element), or 'relative positional and functional' relationship of visual elements together (e.g. a group of visual elements lined up next to each other serving for a particular purpose).

In embodiments, in order to identify the cluster information (CI) that is based on positional relationship of visual elements, the server may utilize DOM (document object model) of the rendered web page to analyze parent, child, and sibling node relationships. In other embodiments, the server may utilize the categorization provided by the subjective function type (SFT) of each visual element, including any other information (e.g. operational function/s of each visual element) determined at 302, in order to identify the cluster information (CI) according to 'positional and functional' relationship of visual elements. Further, the server may also utilize the cluster information (CI) determined at 304 in a feedback loop structure, to identify the subjective function type (SFT) of previously unidentified visual elements, according to the embodiment. In various embodiments, cluster information (CI), identified according to 'positional+functional' relationship of visual elements, includes IDs of uniform visual element identifiers (UVEIs), where each cluster of 'first degree relative visual elements' is designated by a first order cluster ID—that is assigned for each first order cluster (i.e. first order sub-cluster), including information about the functional relationship of the visual elements—within the first order cluster—that is predicted or determined based on the interbedded process of 302 and 304 as discussed with reference to FIG. 3; and each cluster of 'second degree relative visual elements' is designated by a second order cluster ID—that is assigned for each second order cluster (i.e. second order sub-cluster), including information about the functional relationship of the first order sub-clusters—within the second order cluster—that is predicted or determined based on the interbedded process of 302 and 304; and so forth. Clustering based on 'relative positional and functional' relationship of visual elements (i.e. 'positional and functional' relationship in short) may be a more accurate and safer option than only 'relative positional' relationship of visual elements (i.e. only 'positional' relationship in short) for both normally structured web pages and structurally disorganized web pages with disorganized layouts. However, the interbedded process of 302 and 304 may bring more data processing load and thus it may be more time consuming. In order to gain speed and/or decrease the data processing load, the system may use artificial intelligence or machine learning to prefer only positional clustering and bypass the process 302 in order to identify the CI swiftly, and/or may decide which one to use according to the structure/layout of the rendered web page, based on a pre/rough analysis of the page. In one embodiment, the system scans and analyzes popular websites in order to identify and learn their page structures/layouts and use artificial intelligence to decide which method to be used, and records that decisions for each website and/or web page including their locators in a log that is stored in the database. Thus, the system may optimize the performance according to a predefined action.

Next, the server generates a page information file (PIF) containing the IDs of the uniform visual element identifiers (UVEI) —of the visual elements—generated at 216 including their corresponding subjective function type (SFT) determined at 302 and their corresponding cluster information (CI) determined at 304 (306). Page information file (PIF) may also include information obtained in processes 302 and 304, including i) cluster information (CI) determined according to 'positional+functional' relationship of visual elements, ii) subjective function type (SFT) of each visual element including their basic operational function/s, and iii) any other information preferred. A client may use the information provided by a page information file (PIF) —besides uniform visual element identifiers (UVEI) —to identify subjective function type (SFT) —including detected role/s and function/s—of each visual element, and clusters of interrelated visual elements. Thus, the client may identify the availability for interaction, according to a special (e.g. customized) or generalized predefined filtering criteria.

The process terminates after the execution of 306, unless the page is an infinite scrolling web page. In case of an infinite scrolling web page, for every additional manifestation of the web page the process loops between 302 to 306, i.e. all sub processes are executed in sequential order starting at 302 and ending at 306. As a result of the process 300, the client in collaboration with the server, identifies the role (subjective function type) of each visual element including the interrelationship (cluster information) of visual elements of a web page, in order to provide information to the system for identifying visual elements and/or clusters of visual elements that are available to receive one or more user content inputs, according to an embodiment.

To elaborate on the subjective function type (SFT); According to the embodiments, subjective function type (SFT) is a non-overlapping predetermined categorization of each visual element in a web page according to its role. In an example, the predetermined categorizations of the subjective function types may be based on three discrete types: i) main content, ii) side content, and iii) auxiliary element. According to this categorization; an 'auxiliary element' is a visual element that possesses only operational function/s without a subjective function, while a 'main content' or a 'side content' is a visual element that possesses a subjective function besides its operational function/s, in which any additional function beyond operational functions is considered subjective. Essentially, this is a categorization of 2 discrete parent types of page elements: i) elements without a subjective function; and ii) elements involving a subjective function besides their operational function/s.

A web page is an interface whose main purpose is to convey information to a user and receive information from the user. In this context, an auxiliary element is an element that provides only operational help and support in the process of conveying and receiving information without possessing a subjective function. For example; a check box for interaction, a frame grouping elements for ease of perception, an icon for attention, a background texture for decoration, a menu button or a search field for navigation are visual elements without a subjective function, and accordingly are auxiliary elements. However, a heading of a news item, a paragraph of an article, an image of a product or an add, a video of a movie, an audio of a musical piece, an application for gaming, a link preview of another web page, or a document including an e-book, are contents of visual elements possessing functions beyond operational functions about the web page and/or website that they belong to (e.g. content for the consideration of viewer/s), and accordingly are main or side contents. In this regard, while a visual element that functions as a navigation button including the name of the link location is an auxiliary element, a similar visual element that functions as a navigation button including a line of poetry or a mathematical formula—besides the name of the link location—is not, since the additional information that it is carrying is not operational, but for the consideration of the viewers, and accordingly, such a visual element is qualified as main or side content.

To elaborate on the principles to identify subjective function type (SFT); Similar to the visual objects as defined hereinbefore, a visual element may perform one or more of the four basic functions in a web page, besides a primal function: A visual element may be navigational, interactive, decorative, informative, or combinations thereof, and in addition to these four basic functions, a visual element inherently—and inevitably—performs an architectural function by taking part in the formation of a web page, —just like a brick of a wall. These basic functions also define the said operational functions: i) Navigational: A navigational visual element helps viewers to navigate (e.g. through a hyperlink) in a single page and/or multiple pages of a website including links to external web pages. A navigational visual element may include visual/audial/textual content related to navigational processes including markup/script; ii) Interactive: An interactive visual element helps viewers to interact (e.g. through a form) with the web page, and/or with the web page server. An interactive visual element may include visual/audial/textual content related to interactive processes including markup/script; iii) Decorative: A decorative visual element carries content for beautifying a page. A decorative visual element may include visual/audial/textual content with decorative features including markup/script (e.g. a script for fetching images from the server); iv) Informative: An informative visual element provides informative content to users. An informative visual element may include visual/audial/textual content with informative features including markup/script (e.g. a script for fetching text from the server). Note: According to the embodiments, in order to simplify the process 302, informative content used in navigational and/or interactive processes without possessing a subjective function are excluded, and considered as content with navigational and/or interactive features (e.g. purely operational GUI elements such as, addresses, icons, etc.); v) Architectural: An architectural visual element helps viewers to perceive layout and content of a web page more accurately, easily and enjoyably by separating segments, framing interrelated visual elements, etc. Only visual elements with null content are purely architectural (e.g. containers like frames, separators, canvases, etc.), and inherently, every visual element is also architectural by taking part in the formation of the web page.

And lastly, a visual element may also possess more than one of these functions simultaneously. For example, a navigational visual element may also be decorative by involving an image for beautifying the page, while being informative by involving a text relevant with the link location, e.g. the summary of the content of the link location. In principle, informative, navigational, interactive, decorative and architectural functions are all operational functions. However, informative function differs from the rest, because only informative content (e.g. a paragraph or an image) may involve a subjective function, and if this is so, then the visual element is considered as main or side content, else it is auxiliary element. In the context of operational and subjective functions, it can be deduced that any visual element with navigational, and/or interactive, and/or decorative, and/or architectural function/s cannot involve any sort of subjective function, i.e. only a visual element with informative function may involve a subjective function. Although this deduction is important in the process of identifying SFT categories, some navigational, interactive, and decorative visual elements may also possess informative content and thus, informative function, as described in examples herein. Therefore, in various embodiments, functional analysis of each content of a visual element is made according to the basic operational functions, in order to identify their functional relation with the respective visual element.

According to the embodiments, for identifying subjective function type (SFT) of each visual element in a web page that a user is viewing, example rules are listed based on the definitions and deductions presented about SFT categorization: i) Basic operational functions of visual elements are: informative, navigational, interactive, decorative, architectural functions; A visual element may possess one or more of these functions simultaneously, and it always possesses an architectural function; ii) Any additional function of a visual element beside its basic operational function/s is considered subjective, and therefore the visual element is considered subjective, i.e. possessing a subjective function; iii) An auxiliary element is a visual element without a subjective function; A 'main content', or a 'side content' is a visual element that involves a subjective function besides its operational function/s; iv) Any visual element with null content (i.e. without any textual/visual/audial content) is auxiliary element; v) Only informative content may involve a subjective function; vi) An informative visual element is an auxiliary element as long as its content does not involve any sort of subjective function; vii) Any visual element whose function is ambiguous is considered decorative, and therefore considered as auxiliary element.

To elaborate on the process 302 to identify subjective function type (SFT), and the process 304 to identify cluster information (CI), an exemplary interbedded procedure is presented according to the embodiments. In embodiments, for identifying roles, such as main contents, side contents and auxiliary elements of a web page, the following sub-processes are executed in the process 302; In step 302/1: each visual element that includes textual/visual/audial content, —including related markup/script—is identified by the system analyzing content properties and/or content itself (e.g. for markup/script), based on the uniform visual element identifier (UVEI) of each visual element. If a visual element includes textual/visual/audial content then it is flagged as 'unidentified element'; else, it is flagged as 'auxiliary element'. In this step, visual elements with null content are identified (e.g. containers, separators, frames, etc.), and which are considered purely architectural. Although they are null in content, they possess properties such as, size, border size, border color, background color, etc. In one embodiment, the system—roughly—estimates the possible roles of visual elements with null contents by comparing their properties and relative positions with the known web page layouts when rendered.

In step 302/2, among the 'unidentified elements' that are flagged in step 302/1, each visual element with navigational and/or interactive features without possessing a subjective function is identified by the steps: For each visual element among the 'unidentified elements' that are flagged in step 302/1; 302/2.1) detecting textual content—including markup/script—related with the execution of navigational and/or interactive processes; 302/2.2) detecting visual content that is a component of a navigational and/or interactive user interface (GUI), 302/2.3) detecting audial content that is a component of a navigational and/or interactive user interface (AUI); 302/2.4) detecting textual content that is a component of a navigational and/or interactive user interface (GUI); Following the execution of the steps regarding functional analysis 302/2.1 to 302/2.4, executing process 304 for identifying cluster information (CI); 304/1) i) analyzing the position of each detected visual element relative to other visual elements of the web page, ii) analyzing the properties of each detected visual element, and iii) based on the detected roles, relative positions, and properties identifying related visual elements for each detected visual element and grouping the interrelated ones; 302/2.5) for each detected visual element, deciding whether the visual element is auxiliary element or not, based on the steps 302/2.1, 302/2.2, 302/2.3, 302/2.4, 304/1 and by utilizing the information obtained in the step 302/1. Flagging each visual element as 'unidentified element' or 'auxiliary element' according to the decision.

In one embodiment, for each visual element flagged as 'unidentified element'; Regarding the step 302/2.1, textual content including markup is analyzed to detect a hyperlink associated with the visual element for detecting a navigational feature (e.g. URL), and any script associated with the visual element is analyzed for detecting an interactive feature (e.g. JavaScript); Next, the system executes the steps 302/2.2, or 302/2.3, or 302/2.4, or combinations thereof according to the content of the analyzed visual element, (whether or not a navigational and/or interactive feature is detected). Regarding the step 302/2.2, visual content is compared with known graphic components of navigational and interactive GUI elements of web pages such as, buttons, search fields, special shapes, icons (like play, pause record icons) —if any. Further, if the visual element is detected as navigational and/or interactive at the step 302/2.1, then a similarity comparison may be also executed in between the visual content and known graphic components of GUI elements for identifying the purpose of unique images, e.g. special icons, logos, avatars, etc. Regarding the step 302/2.3, audial content is compared with known audial components of navigational and interactive AUI elements of web pages such as, audio like clicks, buzzers, etc. —if any; Regarding the step 302/2.4, textual content is analyzed in order to detect text used only as a component of the GUI that it belongs to, such as an address, an instruction, etc. —if any; Regarding the step 304/1, the position of each detected visual element relative to other visual elements of the web page is analyzed, and based on the detected roles and relative positions, related visual elements for each detected visual element is identified. Accordingly, framing visual elements, i.e. containers, and framed visual elements are identified as groups of interrelated visual elements—if any;

Regarding the step 302/2.5, for each detected visual element, based on 302/2.1, based on 302/2.2, or 302/2.3, or 302/2.4 or combinations thereof, and based on 304/1 the system evaluates the obtained information and decides whether the analyzed visual element is auxiliary element or not. For example, based on the features of the visual elements that are enclosed by a container, and based on the relative position of the framing container, the system may predict the purpose of the enclosed group (e.g. a navigation bar, a header, a footer, a social media post, etc.) and may deepen its evaluation for the role detection of the visual elements within the enclosed group. For a visual element that is detected as possessing navigational and/or interactive features in 302/2.1, possible outcomes are as follows: i) if the content (visual, and/or audial, and/or textual) is a component of a navigational and/or interactive user interface, then the visual element is flagged as auxiliary element. ii) if any of the content (visual, and/or audial, and/or textual) is not a component of a navigational and/or interactive user interface, then the visual element is flagged as 'unidentified element'. For a visual element that is detected as 'not possessing' navigational and/or interactive features in 302/ 2.1, possible outcomes are as follows: i) if the content (visual, and/or audial, and/or textual) is a component of a navigational and/or interactive user interface, then—because its function is ambiguous—the visual element is flagged as auxiliary element; ii) if any of the content (visual, and/or audial, and/or textual) is not a component of a navigational and/or interactive user interface, then the visual element is flagged as 'unidentified element'; according to the embodiment.

In step 302/3, among the 'unidentified elements' that are flagged in step 302/2, each visual element with decorative features without possessing a subjective function is identified by the steps: For each visual element among the 'unidentified elements' that are flagged in step 302/2; 302/ 3.1) detecting visual content with decorative features; 302/ 3.2) detecting audial content with decorative features; 302/ 3.3) detecting textual content with decorative features; Following the execution of the steps regarding functional analysis 302/3.1 to 302/3.3, executing the process 304 for identifying cluster information (CI); 304/2) i) analyzing the position of each detected visual element relative to other visual elements of the web page, ii) analyzing the properties of each detected visual element, and iii) based on the detected roles, relative positions, and properties identifying related visual elements for each detected visual element and grouping the interrelated ones; 302/3.4) for each detected visual element, deciding whether the visual element is auxiliary element or not, based on the steps 302/3.1, 302/3.2, 302/3.2, 304/2, and by utilizing the information obtained in the steps 302/1 and 302/2. Flagging each visual element as 'unidentified element' or 'auxiliary element' according to the decision.

Various strategies may be applied for the detection of visual, audial and textual content with decorative features, without possessing a subjective function. One strategy may be comparing positions of the visual content relative to other visual elements containing visual content for detection of overlapping sections. For example, any visual content that is located under another visible content may be considered as background image, and thus decorative. Similarly a background music may be considered as decorative. Another strategy may be using size and location factors together for identifying images like logos, icons, etc. For example a visual element containing a relatively small sized image located at the top left of a web page without possessing navigational or interactive features may be considered as an ornamental image with pure decorative features. In some cases, separating decorative content from informative ones may require more effort, e.g. due to the similarities of contents. Semantic analysis of textual, visual and audial contents, may be used in such cases.

In one embodiment, for each visual element flagged as 'unidentified element'; Regarding the step 302/3.1, visual elements including images or image sequences with overlaying visual elements including visible content upon them are detected, and also other images like icons, logos, etc. are detected base on their relative positions and their properties like size, shape, etc.; Regarding the step 302/3.2, audio used for decorative purposes such as background music, etc. are detected; Regarding the step 302/3.3, text used for decorative purposes such as, a background fill, ornamental patterns etc. are detected; Regarding the step 304/2, the position of each detected visual element relative to other visual elements of the web page is analyzed, and based on the detected roles and relative positions, related visual elements for each detected visual element is identified. Accordingly, framing visual elements, i.e. containers, and framed visual elements are identified as groups of interrelated visual elements—if any; Regarding the step 302/3.4, for each detected visual element, based on 302/3.1, or 302/3.2, or 302/3.3 or combinations thereof, and based on 304/2, and also utilizing the information obtained by the previous steps 302/1 and 302/2, the system evaluates all obtained information and decides whether the analyzed visual element is auxiliary element or not. For example, based on the features of the visual elements that are enclosed by a container, and based on the relative position of the framing container, the system may predict the purpose of the enclosed group (e.g. a header with a background picture or a canvas with ornamental patterns etc.) and may deepen its evaluation for the role detection of the visual elements within the enclosed group. For a visual element that is processed by the step 302/3, possible outcomes are as follows: i) if the visual element possesses only decorative function (i.e. visual, and/or audial, and/or textual content is decorative), then the visual element is flagged as 'auxiliary element'; ii) if the visual element possesses only navigational and/or interactive function/s with a decorative function, then the visual element is flagged as 'auxiliary element'; iii) else, the visual element is flagged as 'unidentified element'; according to the embodiment.

In step 302/4, among the remaining 'unidentified elements' that are flagged in step 302/3, each visual element with informative features without possessing a subjective function is identified by the steps: For each visual element among the 'unidentified elements' that are flagged in step 302/3; 302/4.1) detecting visual content with informative features without a subjective function; 302/4.2) detecting audial content with informative features without a subjective function; 302/4.3) detecting textual content with informative features without a subjective function; Following the execution of the steps regarding functional analysis 302/4.1 to 302/4.3, executing the process 304 for identifying cluster information (CI); 304/3) i) analyzing the position of each detected visual element relative to other visual elements of the web page, ii) analyzing the properties of each detected visual element, and iii) based on the detected roles, relative positions, and properties identifying related visual elements for each detected visual element and grouping the interrelated ones; 302/4.4) for each detected visual element, deciding whether the visual element is auxiliary element or not, based on the steps 302/4.1, 302/4.2, 302/4.3, 304/3, and by utilizing the information obtained in the steps 302/1, 302/2, and 302/3. Flagging each visual element as 'main or side content' or 'auxiliary element' according to the decision.

Various strategies may be applied for the detection of visual, audial and textual content with informative features without possessing a subjective function. According to the processes 302/1, 302/2 and 302/3, architectural, navigational and/or interactive, decorative visual elements including ambiguous ones (which are flagged as decorative) are identified and flagged as auxiliary elements. In addition, at 302/3, 'navigational and/or interactive+decorative' visual elements are also identified (based on 302/2) and flagged as auxiliary elements. Any remaining visual element that is flagged in step 302/3 as 'unidentified element' possesses an informative function, —with or without other basic operational functions—, and may or may not have a subjective function. These visual elements may be: 'informative', 'informative+navigational and/or interactive', 'informative+decorative', or 'informative+navigational and/or interactive+decorative'. One strategy may be a rough elimination based on content type. Unlike text and images, most of the multimedia files (e.g. videos, audios, image sequences etc.) are main or side contents, and they may be flagged directly as main or side content. However, it is still possible to encounter with a video, audio or multimedia file in a web page that is used purely for operational purposes, e.g. an instructional video about an interactive feature of the web page, or an audio guide for navigating within the website. For precise identification of such content, semantic analysis may be a requirement.

On the other hand, in steps 302/1, 302/2 and 302/3, since all operational functions of visual elements are identified (as architectural, navigational, interactive, and decorative respectively and the rest as informative), including clusters of interrelated visual elements (with the exception of the ones belonging to informative visual elements, which are being determined in this step), more practical approaches are also possible. In this context, one strategy may be identifying positional and functional relationship of the content with the cluster that it belongs to, based on: i) the properties of the content such as, size for images or number of characters for text; ii) previously identified function/s of the visual elements that are members of the cluster; iii) predicted or identified function of the cluster as a whole. For example, a relatively short text—that is purely informative without navigational and/or interactive features—located on the header may be considered as the name or label of the web page or website, and thus, informative content without a subjective function. However, a relatively long text located on the header may be considered as informative content with a subjective function. For example, it can be a quote or a message from the author of the web page. Further, clusters of visual elements with distinctive features may be defined to the system. For example, tables may be defined to the system, in which the content of a data cell element is informative with a subjective function, while the content in a column or row header (e.g. names of the variables) is informative without a subjective function. Furthermore, the system may identify the functions of higher rank clusters by prediction based on the identified functions of visual elements, identified functions of lower rank clusters, and consideration of the positional and functional relationship of lower rank clusters according to the know higher rank clusters with distinctive features. For example, a container including, a link preview with a commenting interface may be considered as a social network post. In general, this strategy may be applied for identifying text and/or image content of articles, social media posts, comments, comments related with the social media posts, etc. And may be supported with semantic analysis of contents.

In one embodiment, for each visual element flagged as 'unidentified element'; Regarding the step 302/4.1, each visual element including an image is analyzed according to its content properties (e.g. size and shape), its positional and functional relationship with the cluster that it belongs to, and predicted or determined function of the cluster as a whole—if available. Based on the analyses, each informative content without a subjective function is detected. All video and multimedia files, and all image sequences are considered as possessing a subjective function; Regarding the step 302/4.2, each visual element including a relatively small sized audio file is analyzed based on semantic analysis. Based on the analyses, each informative content without a subjective function is detected. The rest of the audio files—including the audio data of video files—are considered possessing a subjective function; Regarding the step 302/4.3, each visual element including text is analyzed according to its content properties (e.g. number of characters, words, sentences, etc.), its positional and functional relationship with the cluster that it belongs to, and predicted or determined function of the cluster as a whole—if available. Based on the analyses, each informative content without a subjective function is detected; Regarding the step 304/3, the position of each detected visual element relative to other visual elements of the web page is analyzed, and based on the detected roles and relative positions, related visual elements for each detected visual element is identified. Accordingly, framing visual elements, i.e. containers, and framed visual elements are identified as groups of interrelated visual elements—if any; Regarding the step 302/4.4, for each detected visual element, based on 302/4.1, or 302/4.2, or 302/4.3 or combinations thereof, and based on 304/3, and also utilizing the information obtained by the previous steps 302/1, 302/2 and 302/3, the system evaluates all obtained information and decides whether the analyzed visual element is 'main or side content' or auxiliary element. For example, based on the features of the visual elements that are enclosed by a container, and based on the relative position of the framing container, the system may predict the purpose of the enclosed group and may deepen its evaluation for the role detection of the visual elements within the enclosed group. For a visual element that is processed by the step 302/4, possible outcomes are as follows: i) if the informative content of the visual element does not possess a subjective function (i.e. visual, and/or audial, and/or textual content without a subjective function) then the visual element is flagged as 'auxiliary element'; ii) if the informative content of the visual element does possess a subjective function (i.e. visual, and/or audial, and/or textual content with a subjective function) then the visual element is flagged as 'main or side content'; according to the embodiment.

In step 302/5, among the remaining visual elements that are flagged as 'main or side content' in step 302/4, each visual element with side content (i.e. extraneous content) is identified by the steps; For each visual element among the 'main or side contents' that are flagged in step 302/4; 302/5.1) detecting visual extraneous content; 302/5.2) detecting audial extraneous content; 302/5.3) detecting textual extraneous content; Flagging each detected visual element as 'side content' and flagging the rest as 'main content'. Since the cluster information (CI) is identified for all visual elements of the web page in the previous steps 302/1, 302/2, 302/3 and 302/4, and since the final decision step is needles, process 304 and the final step are eliminated.

Various strategies may be applied for the detection of side content, i.e. extraneous content. One strategy may be detecting third party websites, e.g. by analyzing download/upload activities. Another strategy may be detecting ads based on the industrial standards that are being used, such as standardized banner sizes, or add fields etc. Another strategy may be semantic analysis of textual, visual and audial contents, which may be considered as the most reliable but the most costly in terms of the data processing load. In one embodiment, for each visual element flagged as 'main or side contents'; Regarding the step 302/5.1, image and field size of the visual element is compared with known industry standards, and flagged as suspicious if it matches. Next, download/upload activities of the—suspicious—visual element may be inspected based on the related markup/script and fetched data. As a result, third party ad resource and visual extraneous content is detected; Regarding the step 302/5.2, audial extraneous content is detected by detecting 3th party streaming transmissions; Regarding the step 302/5.3, textual extraneous content is detected by semantic analysis; Regarding the outcome of the step 302/5, among the visual elements that are flagged as 'main or side contents' each visual element with 'side content' is identified, and accordingly each visual element with 'main content' is identified; according to the embodiment. In addition to all these, 'main content' may be sub-categorized and be used for further filtering of visual elements for interaction. In one embodiment, content published by the website (e.g. columns, articles, news items, etc.) and content published by the viewers (e.g. comments, etc.) are identified and only website's content is filtered for interaction (e.g. based on functional analysis, cluster information, etc.). In another embodiment, link previews of other web pages, and dynamic data displayed in tables (e.g. fetched data from the database of the website displayed in a HTML table upon a request) are identified and filtered out (e.g. based on functional analysis, cluster information, etc.).

To summarize the processes 302 and 304, which are interbedded according to the embodiment; In step 302/1, visual elements with null content, i.e. purely architectural visual elements, are identified, and the remaining visual elements may be flagged as 'unidentified element' and filtered for further evaluation. At this stage, 'unidentified elements' to be processed may include visual elements with navigational features, and/or interactive features, and/or decorative features, and/or informative features, or—as a special case—ambiguous features—which are considered as decorative—, with or without a subjective function. In step 302/2, visual elements with navigational and/or interactive features without possessing a subjective function are identified—if any. Furthermore, by the step 304/1 cluster information (CI) of the said visual elements are identified, and thus, clusters of interrelated visual elements regarding the said visual elements are determined—if any. In this process, any visual element containing a visual or audial or textual content that is not related with navigational and/or interactive functions is flagged as 'unidentified element' and filtered for further evaluation. In step 302/3, visual elements with decorative features without possessing a subjective function are identified—if any. Furthermore, by the step 304/2 cluster information (CI) of the said visual elements are identified, and thus, clusters of interrelated visual elements regarding the said visual elements are determined—if any. In this process, any visual element containing a visual or audial or textual content that is not related with the decorative functions is flagged as 'unidentified element' and filtered for further evaluation. In step 302/4, visual elements with informative features without possessing a subjective function are identified—if any—, and the rest of the visual elements are flagged as 'main or side content'. Furthermore, by the step 304/3 cluster information (CI) of the said visual elements are identified, and thus, clusters of interrelated visual elements regarding the said visual elements are determined—if any. In step 302/5, each visual element with side content is identified—if any—, and accordingly remaining ones are flagged as main content. As a result, the system identifies basic operational function/s of each visual element, while identifying any subjective function categorized as main or side content, and determines clusters of interrelated visual elements, according to the embodiment. In one embodiment, in order to speed up the process 302/1 to 302/5, for the uniform web pages of websites (e.g. Twitter, Instagram, Facebook etc.), before executing 302/1, common objects of web pages are identified such as, header, footer, local navigation boxes, scan columns, etc., by comparing the web pages of the website. Next, based on the common visual elements, the system—roughly—estimates the possible roles of the visual elements by comparing their properties and relative positions in the rendered web page with known web page layouts.

Figure 4:
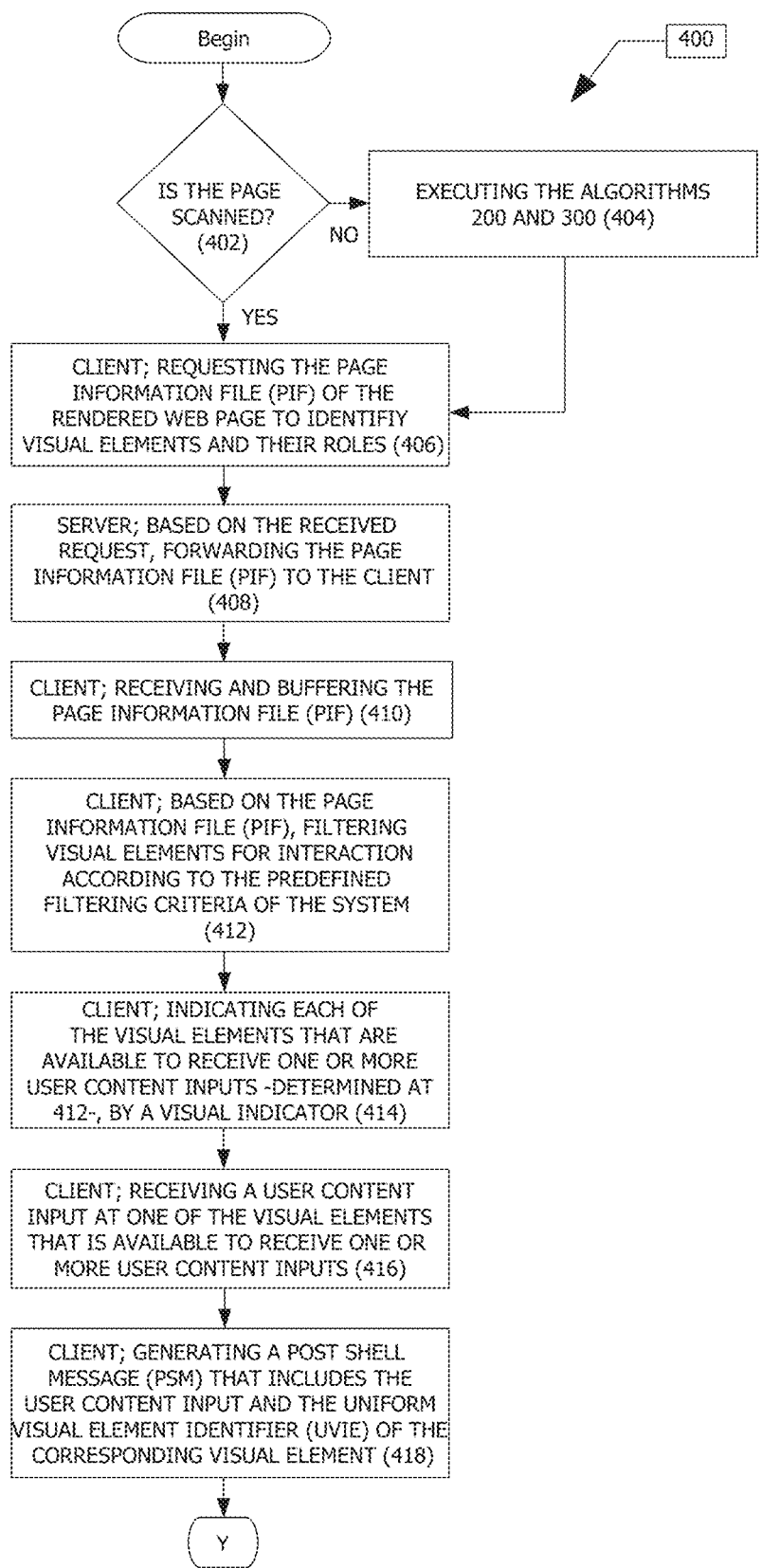
FIG. 4 is a flow diagram illustrating an example process to filter visual elements for interaction, and based on receipt of a selection by a user from among these filtered visual elements, to associate user content inputs with selected visual elements of a rendered web page.
Figure 4:
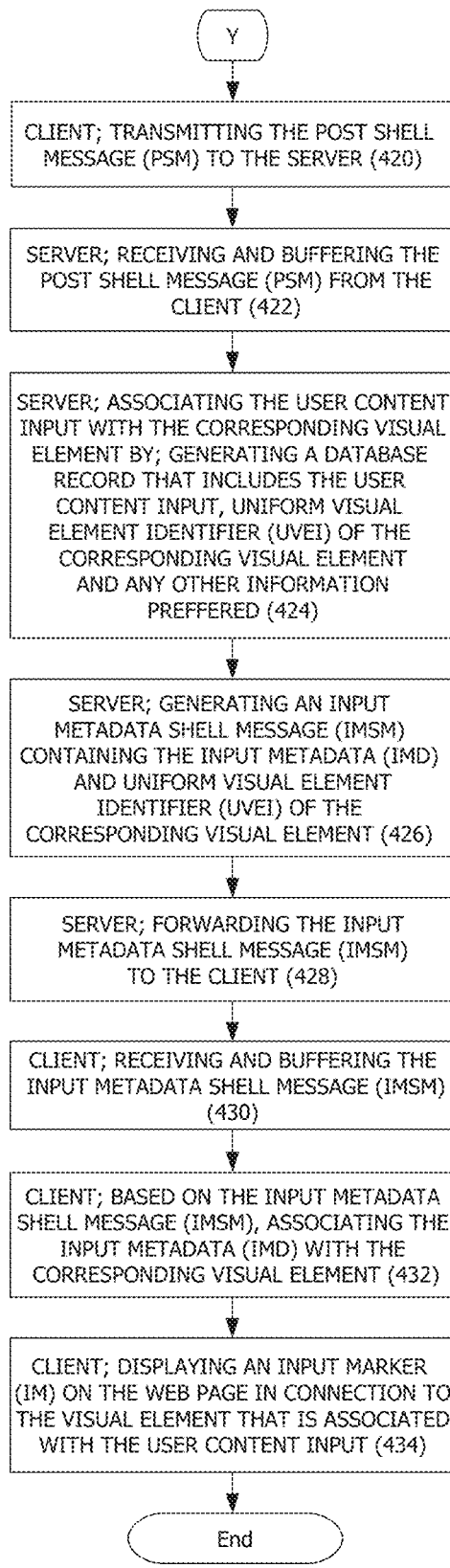

FIG. 4 is the flow diagram 400 illustrating an example process to filter visual elements for interaction, and based on user's selection among these filtered visual elements, to associate user content inputs with selected visual elements of a rendered web page, according to an embodiment.

The process begins with the request of a system user from the client to associate a user content input with a visual element of a rendered web page. At 402, the client inquiries whether the rendered web page is scanned, i.e. processed by 200 and 300, or not. If the web page is not scanned, then the process 200 and the process 300 may be executed respectively at 404 before 406 is executed. Else, 406 is executed immediately after.

At 406, the client requests the page information file (PIF) of the rendered web page generated at 300. Next, based on the received request, the server forwards the page information file (PIF) to the client (408), and the client receives and buffers the page information file (PIF) (410).

Next, based on the page information file (PIF), the client decides the availability of each visual element for interaction, according to a predefined filtering criteria of the system and flags the UVEIs as 'available' in the PIF, which is buffered in the client. In more detail, based on the role of each visual element and their interrelationship determined at 300, the client (or the server in another configuration) filters visual elements for interaction according to a predefined filtering criteria of the system, (e.g. as only main content, only side content, only auxiliary elements, or any combination thereof for associating user generated contents, and/or as dusters of interrelated visual elements according to their 'positional', or 'positional+functional' relationships for associating user generated software apps), and enables filtered visual elements for interaction, while disabling the remaining visual elements (412). Filtering criteria of the embodiments may vary. For example, for associating user generated contents, in order to focus on contextual information of web pages, e.g. news, articles, comments, videos, social media posts, etc., only visual elements including main content may be available for interaction. According to various embodiments, for associating a user generated content, the system may allow selection of only one visual element among the filtered ones. However, for associating a user generated software app, the system may allow selection of a cluster of visual elements among the filtered ones, and thus, may associate a user generated software app with one or more visual elements. In this process, the system utilizes the interrelated visual elements that are identified and grouped at 300, —where the relationship may be positional, and/or 'positional+functional', and/or any other predefined relationship criteria-, and filters them for interaction, according to a predefined filtering criteria. For associating user generated software applications, predefined filtering criteria may be filtering only clusters with 'positional+functional' relationships. However, predefined filtering criteria may be more specific about the clusters to be filtered for interaction.

For example, some particular clusters with distinctive features may be predefined in the system, —which may be specific to certain websites or may be used in general—such as, link previews, social media posts, headers, footers, menu boxes, navigation bars, tables, commenting interfaces, etc., and they may be identified by analyzing the previously detected roles and relationships at 300 (FIG. 3), according to the embodiments. In such embodiments, general features of clusters may be defined and introduced to the system by 'positional and functional' relationships of the visual elements together—instead of only positional—because layouts of clusters may alter in time. In this context, —for example—a social media post may be defined and introduced to the system as a cluster including at least 3 sub-clusters due to one of them including main content, one of them including author ID, and one of them including a commenting/reaction interface. Thus, the mediums used in web pages such as, social media posts, link previews, commenting inter-faces, tables, media players etc. may be introduced to the system according to their qualifications and characteristics instead of dictating raw positional data only, —which may be considered non-persistent for most of the cases. Alternatively, or in addition, the system may also enable a user to define a cluster of visual elements and introduce it to the system by manual selection of visual elements from among the visual elements of a rendered web page. Thus, a system user may define a unique cluster to be manipulated by one or more software applications each tailored for the defined cluster.

Next, the client indicates each of the visual elements that are available to receive one or more user content inputs—determined at 412—by a visual indicator, e.g. by highlighting the available (filtered) visual element field (414). Thus, the system user may select a visual element and/or a cluster of visual elements for associating a user content input. In embodiments for associating user generated contents, the system highlights the available visual element fields in green, and for associating user generated software apps the system highlights the available visual element fields in blue.

Next, the client receives a user content input for a visual element or a cluster of visual elements that is available to receive one or more user content inputs (416). In various embodiments, system users create user content inputs via an input interface that is particularly designed for generating user content inputs. In embodiments, for enabling users to generate software applications, a software development tool is provided. According to the embodiments, the software development tool isolates a selected cluster, and indicates each sub-cluster according to the ranks of interrelationship within the selected cluster (similar to a DOM tree, where the document is the selected cluster), wherein a system user may include additional content—including scripts—, and/or alter the properties of visual elements, and/or add new visual elements, and/or define the fields or portions of the fields of visual elements to be manipulated by the script that he/she is developing. In another embodiment, based on a user's selection of an available cluster, the system displays a list of—system executable—software apps that are particularly developed for the selected cluster of interrelated visual elements. Thus, the user may select an already existing user generated software app to manipulate a cluster.

Next, the client generates a post shell message (PSM) that includes all information pertaining to the user content input and the uniform visual element identifier/s (UVEI) of the corresponding visual element/s including each corresponding subjective function type (SFT) and corresponding cluster information (CI) (418). In various embodiments, post shell message (PSM) also includes other information obtained in processes 302 and 304, such as, operational function/s of each visual element, etc.

Next, the client transmits the post shell message (PSM) to the server (420), and the server receives and buffers the post shell message (PSM) (422).

Next, the server associates the user content input with both the corresponding visual element and the hyperlink that is associated with the visual element—if any—by generating a database record that includes the user content input, uniform visual element identifier (UVEI) of the corresponding visual element including its corresponding subjective function type (SFT) and corresponding cluster information (CI) and any other information preferred (424). In one embodiment, the server appoints a unique resource identifier (e.g. an URL) for the user content input as the database ID and creates a database record for the user content input under this ID where the server records all information according to the database fields of the user content input such as UVEI, SFT and CI of the associated visual element, contents of the user content input, comments, etc. Database record of the user content input is updated whenever the user content input is edited, or comments are added. In one embodiment, for each user content input, a dedicated web page that includes the content of the user content input is also generated, and the web page is addressed with the appointed resource identifier that is used as the database ID. In various embodiments, only one visual element is associated with a user content input if the user content input is a user generated content, while one or more visual elements are associated with a user content input if the user content input is a user generated software app. In addition to that, in case of user generated contents, subjective function type (SFT) and cluster information (CI) are temporary references used for each viewing session of a client, and thus they are not recorded in the database and not included to post shell message (PSM). On the other hand, in case of user generated software apps, subjective function type (SFT) and cluster information (CI) are permanent references used against contextual and/or structural alterations of interacted clusters of web pages/websites, and thus they are included to post shell message (PSM) and recorded in the database. Thus, positional and functional relationship of visual elements within an interacted cluster may be used as a reference to identify the cluster if it alters, and further, may be used for adapting the associated software applications to the existing state of the altered cluster. For example the layout of uniform social media posts (i.e. post interface) of a social media website may alter in a way that relative positions of all sub-clusters such as, 'author information', 'main content', 'reaction interface', 'commenting interface' may completely change. Furthermore, content and properties of the visual elements, such as icons, shapes, background colors, etc., may also alter completely. However, the system may still identify the altered 'post interface' based on the analysis according to the positional and functional relationship within the clusters of the pages of the said social media website.

Next, for the user content input, the server generates an input metadata shell message (IMSM) containing input metadata (IMD), i.e. metadata of the user content input, and uniform visual element identifier/s (UVEI) of the corresponding visual element/s (426).

Next, the server forwards input metadata shell message (IMSM) to the client (428), and the client receives and buffers input metadata shell message (IMSM) (430).

Next, for the input metadata shell message (IMSM) received, the client associates input metadata (IMD) with the corresponding visual element/s of the web page (432).

Next, the client displays an input marker (IM) on the web page in connection to the corresponding visual element and/or cluster of visual elements that is associated with the user content input (434).

The process terminates after the execution of 434. As a result of the process 400, the client, in collaboration with the server, associates a user content input with a visual element and/or a cluster of visual elements that are available to receive one or more user content inputs, according to an embodiment.

To elaborate on the subject of interacting with link previews of web pages; Link previews are hyperlinks with a preview. The preview may be textual and/or visual, and/or audial content including metadata about the linked web page. They can be permanent or temporal on a web page. They are mostly used in web pages through dynamic visual elements to alternately present available content of the website, or used in the search engine result lists. According to the embodiments, interacting with link previews is also an option, —if preferred so. According to the process 400, when a user content input is associated with a visual element, it is also associated with the hyperlink associated with the visual element—if any—, and accordingly the user content input becomes associated with the link location besides the visual element. Further, according to the process 200, for each rendered web page, the database is queried to determine whether the hyperlinks detected in the web page are links of interacted web pages or not. Furthermore, since a link preview is a visual element and/or cluster of visual elements possessing informative and navigational features with certain attributions, link previews may also be identified by utilizing the process 300. In general, any visual element or cluster of visual elements with identifiable features, —such as link previews—, may be identified by utilizing the process 300. In one embodiment, link previews—which are categorized as main or side content according to their roles in a web page—are also identified and disabled for interaction, while any link preview— including search engine results—, that belongs to an interacted web page is determined and marked with one or more input markers (IM) according to the types of associated user content inputs. Thus, through the input markers (IM), metadata of all associated user content inputs of the previewed web page (except software apps that are integrated with the page) may be reached by users without leaving the rendered web page. In one embodiment this feature is used as a signalization mechanism for identifying and marking the link previews of web pages with special conditions such as, containing fake and doctored news. In this regard, once a web page is flagged by a particular user content input, then the link previews of the web page may also be flagged by the system to indicate the condition throughout the data network (e.g. via marking social media posts, search engine result lists, web pages, etc. containing link previews).

To elaborate on the content deletion of websites; For the cases where a user content input cannot be associated with any object of a web resource (e.g. due to deletion of the content) it may be recorded in the database and a dedicated web page may be created. Moreover, a unique, dedicated web page with a persistent resource identifier (e.g. URL) may be created for each user content input, for all cases. Thus, user content inputs survive even if the website, web page or content that the user content input was associated with is deleted. In this context, all user content inputs of a system user may be presented in chronological order and/or according to topic headings on the system user's web page in a manner reachable by other system users, together with links to the web pages with which they are associated.

Figure 5:
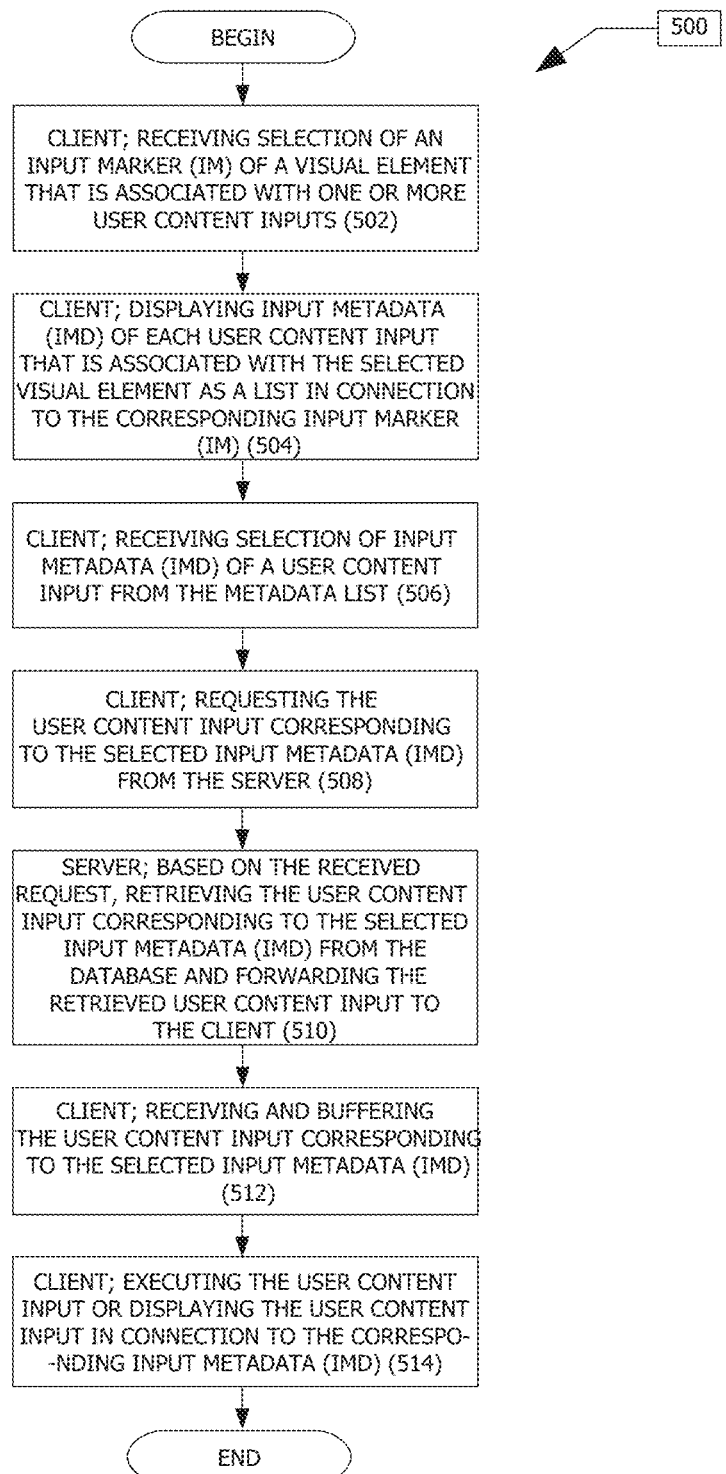
FIG. 5 is a flow diagram illustrating an example process to display metadata and content of user content inputs in connection with the corresponding visual elements of a rendered web page.

FIG. 5 is the flow diagram 500 illustrating a process to display metadata and content of user content inputs in connection to the corresponding visual elements of a rendered web page, according to an embodiment;

The process begins with the selection of an input marker (IM) of a visual element—of a rendered web page—that is associated with one or more user content inputs, by the system user. In one embodiment, system user selects the input marker (IM) by clicking a pointing device. At 502, the client receives the selection.

Next, based on the received selection and input metadata shell messages (IMSM) received and buffered at 224 and/or 430, the client displays input metadata (IMD) of each user content input that is associated with the selected visual element as a list in connection to the corresponding/selected input marker (IM) (504). In one embodiment, N number of input metadata (IMD) is listed in rows for N number of corresponding user content inputs. The user browses metadata list that is ranked according to various ranking algorithms for display on the web page. The list scrolls downward if needed. Input metadata (IMD) contains summary info such as heading, rank, popularity score, publisher etc., and the system user may decide whether to reach content pertaining to a user content input or not according to metadata.

Next, the client receives selection of input metadata (IMD) of a user content input from the metadata list (506). In one embodiment, a system user selects one of the input metadata (IMD) from the metadata list manually by a pointing device.

Next, the client requests content pertaining to the user content input corresponding to the selected input metadata (IMD) from the server (508).

Next, based on the received request, the server retrieves the requested content pertaining to the user content input corresponding to the selected input metadata (IMD) from the database and forwards it to the client (510).

Next, the client receives and buffers the content pertaining to the user content input corresponding to the selected input metadata (IMD) (512).

Next, if the user content input is user generated content, then the client displays the content pertaining to the user content input in connection to the corresponding input metadata (IMD), else the client executes the user generated software application (514). As a result of the process 500, the client, in collaboration with the server, displays metadata and content of user content inputs in connection to the corresponding visual elements and/or clusters of visual elements, and/or displays metadata of user generated software apps and executes the selected ones according to an embodiment.

Figure 6:
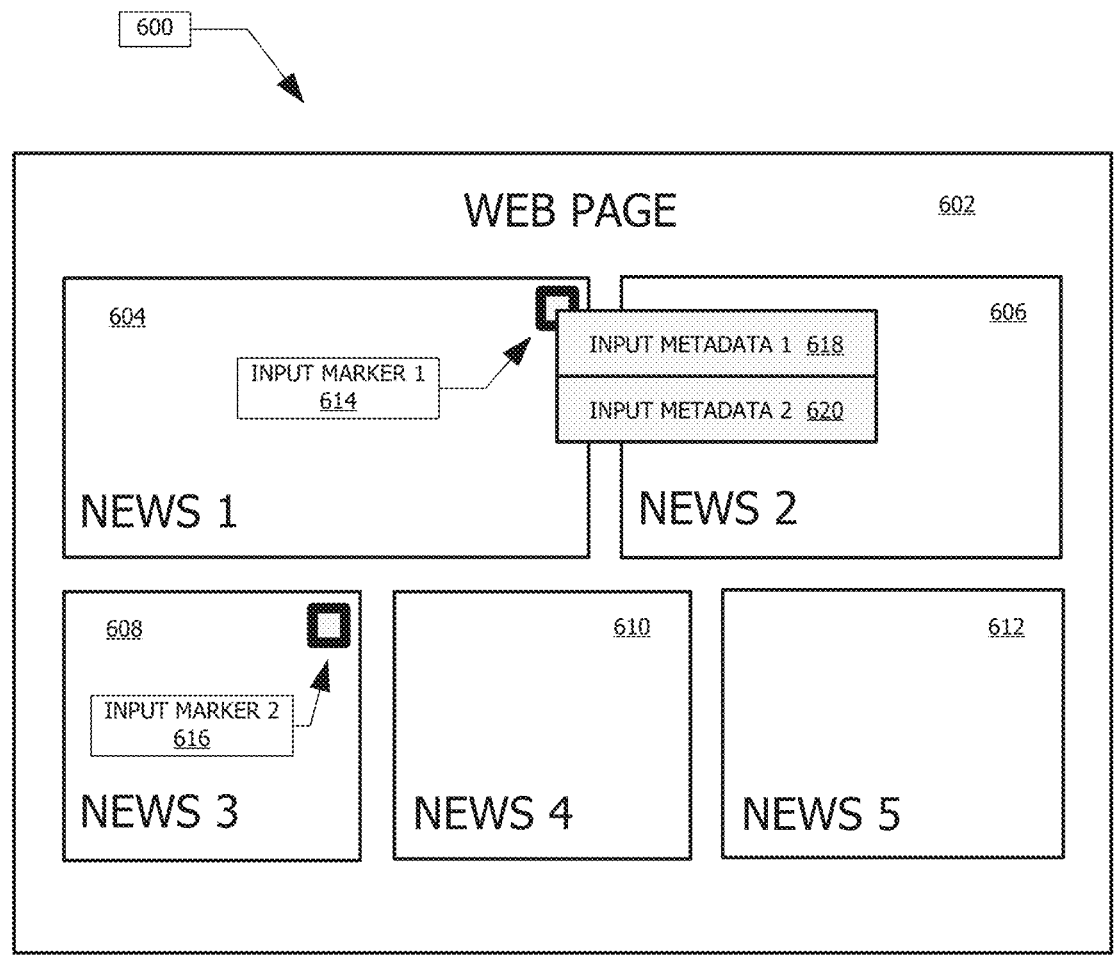
FIG. 6 is an exemplary user interface displaying a plurality of input markers (IM) and input metadata (IMD) of associated user content inputs on a rendered web page.

FIG. 6 is an exemplary user interface 600 displaying a plurality of input markers (IM) and input metadata (IMD) of various user content inputs that are associated with a web page 602, according to an embodiment. The web page 602 include several visual objects, shown as 604, 606, 608, 610, and 612. A plurality of user content inputs are associated with visual objects 604 and 608, and they are marked with input markers 614 and 616 respectively. 618 and 620 are input metadata (IMO) of previously received user content inputs associated with the visual object 604. Input metadata 618 and 620 are displayed on the web page 602 as a list, in connection to the associated visual object 604. Infinite numbers of input metadata (IMD) associated with a visual object may be displayed by a system user via scrolling down the list.

Figure 7:
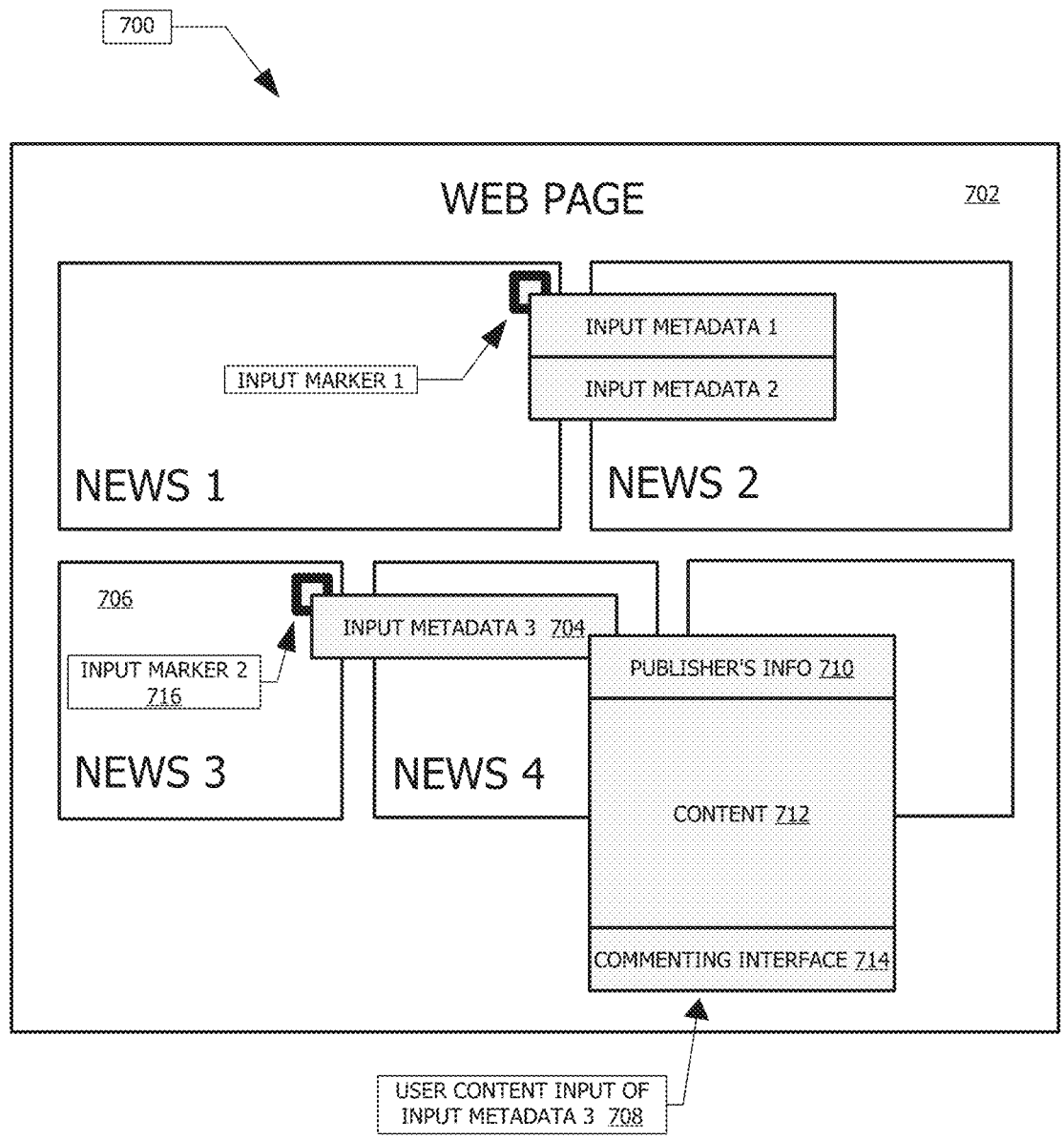
FIG. 7 is an exemplary user interface displaying a user content input corresponding to an input metadata (IMD)

FIG. 7 is an exemplary user interface 700 displaying a user content input corresponding to a selected input metadata (IMD) at a web page 702, according to an embodiment. As shown, a system user selects input metadata 704 corresponding to the input marker 716 displayed in connection to the associated visual object 706 and based on the selection, the user content input 708 that includes publisher's information 710, content 712, and a commenting interface 714, is displayed in connection to the corresponding input metadata 704 on the web page 702.

Figure 8:
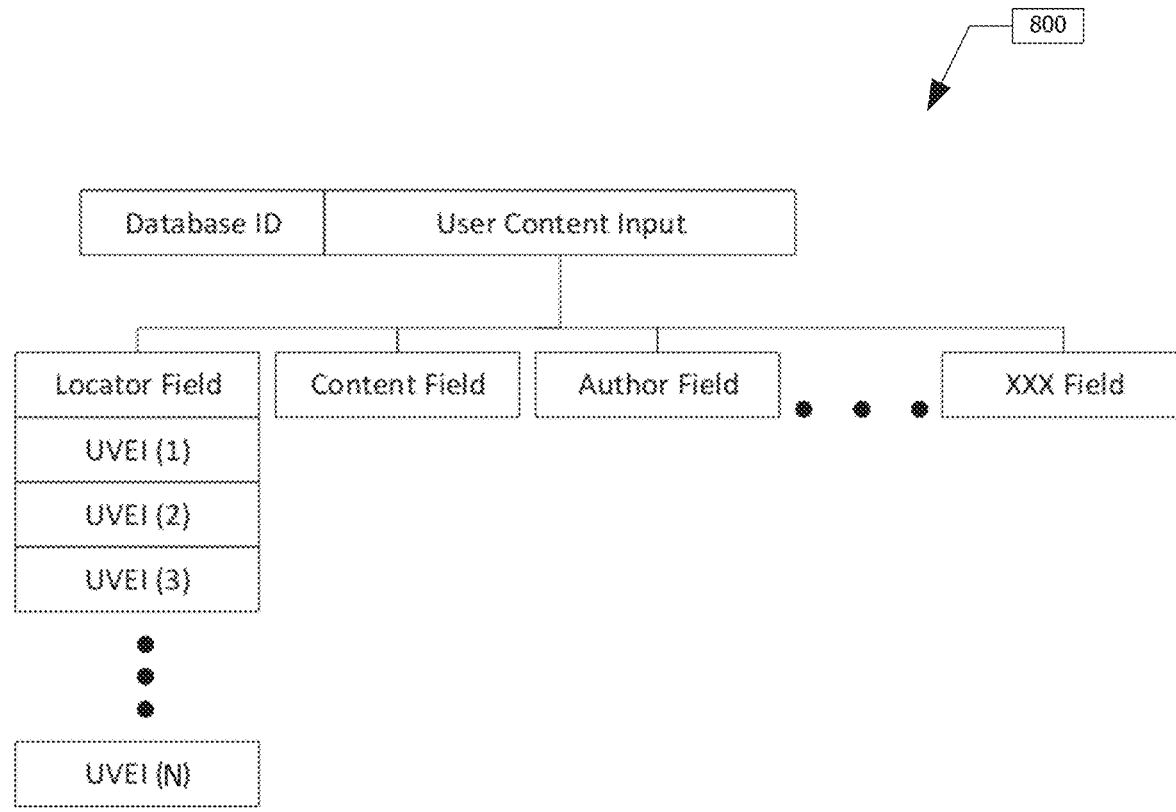
FIG. 8 is an exemplary database record structure representing a database record for a user content input.

FIG. 8 is an exemplary database record structure 800 representing a database record for a user content input. As illustrated in FIG. 8, the database record structure 800 includes a database ID for each user content input stored in the database. In database record structure 800, fields of a user content input record are displayed as locator field, content field, author field, and any other field etc. The association of a user content input may be identified by the UVEI/s recorded in the locator field. The content field includes the content of the user content input. The database record structure 800 may also include an author field to identify the author of the user content input, as well as other fields related to the user content input or the author, such as a date of generation/revision of the user content input, contact information for the author, and other such information. As discussed hereinbefore, the UVEIs stored in the database record structure 800 are only recorded UVEIs (rUVEIs) and a visual element with which a user has interacted is associated through an rUVEI, such as within the user content input database record structure 800. In this regard, database is queried based on the comparison of rUVEIs with the nUVEIs that are identified in each viewing session of a client on a rendered web page. Any number of rUVEIs may be stored in the database record structure 800. User content input may be associated with a cluster of visual elements, thus multiple UVEIs may be recorded in the locator field of the user content input record, and thus these UVEIs become rUVEIs. Alternatively, or in addition, user content input may be associated with only a single visual element through a single rUVEI, according to the embodiments.

Examples of Possible Industrial Implementations

Within the scope of any data network including the Internet, embodiments provide an infrastructure that enables a controlled interaction environment on web resources, where the system continuously and dynamically adapts itself to the contextual and/or structural alterations of web resources, while controlling the objects to be interacted, e.g. according to their roles, and/or interrelationship, and/or predefined features introduced to the system. Thus embodiments provide an infrastructure that enables a steady and consistent interaction environment, where human and machine users may interact with the web resources by adding—and/or reaching to—virtually any kind of user generated content and/or user generated software app, or interact with each other through user generated contents and/or user generated software apps that act as network links. The current disclosure therefore offers a new communication medium where system users may build a web on the Web, while improving or integrating the services of websites, and challenging the information right at the source without technical and/or structural limitations or limitations imposed through administrative regulations, such as membership requirements, permissions, moderation or censorship. In this context, unlimited number of sub implementations may be formed with many practical benefits.

Some of the benefits of the system are as follows: i) Superimposed Communication: The concept can be simplified as the communication through a virtual super-layer of user generated web resources (e.g. user generated contents and/or user generated software apps, such as posts and apps, etc.) that are superimposed on the Web in coordination with conventional web resources. Accordingly, administrative restrictions including moderation and censorship, membership requirements, technical/structural limitations, etc. can be fully eliminated, such as by adding a post, comment, review or any kind of user generated content on a web page of any website including social media web pages. ii) Superimposed Networking: 'Superimposed Networking' is social networking based on Superimposed Communication, by which any field of a web page can become a junction point connecting users with each other through superimposed web resources, —just like the user pages or circulating posts in conventional social media. Via superimposed posts or apps that act as virtual network links, the whole Web may function as a global social networking platform. For example, a system user may connect to the publisher of a post or connect to other system users that are commenting on the post. Furthermore, system users may communicate through various other interfaces deployed on user generated contents, (e.g. messaging, reacting interfaces), while adding each other to their follow list or friends list. iii) Superimposed Applications: Any field of a web page may be modified by user generated software apps that are superimposed on web resources, in order to improve the services or to integrate services of external web pages. Thus, limited features and services of the websites may be improved. Further websites may become integrated. For example, while Facebook does feature a 'like' poll button, it does not feature a 'dislike' poll button. A functional 'dislike' poll button and its counter may be integrated on all posts of Facebook. A more complex example may be the integration of services of rival websites within each other or within third party websites, thus websites on the Web may be virtually integrated by the system users. iv) Superimposed Signalization: Once a user content input is associated with a web resource, that association is conserved throughout the Web. This can be defined as a propagative or expansionist feature of the technology. This feature also paves the way for creating a global signalization mechanism throughout the Web, where existing or circulating Web content can be automatically marked and flagged to indicate the presence of a remarkable condition like fake, doctored news wherever they appear. This mechanism can be used to fight against disinformation such as fabricated news or fake reviews. v) Others: Posts, comments, reviews or any kind of user generated content may be gathered up, on a single, integrated platform and this platform may archive and/or present user generated contents in association with their publishers, instead of disassociated posts/comments on different websites. The noticeability of users who provide content on the Web may be enhanced. For example, an able critic may get noticed by millions—at the very source of the subject matter or information—by adding her own article on top of the article of a popular columnist in a global news website, e.g. New York Times, Le Monde, etc. If liked, the user may gain followers and may be able to expand worldwide through her own superimposed network. Some of the sub implementations of the system are as follows:

As an example implementation, the current disclosure may be used for providing an e-commerce platform. A superimposed e-commerce network may be set up on existing e-commerce websites. For example, user generated contents including goods or services of other e-commerce websites or local businesses—at the same location with the system users—may be added automatically or manually on product core pages of the major e-commerce websites (e.g. Amazon.com, Alibaba.com, Walmart.com, etc.). Thus, small and medium scale e-commerce enterprises or local businesses may compete against large scale major/global corporations virtually on superimposed networks. Further, system users may become sellers of goods and providers of services on e-commerce giants. For example, a very small local business or an individual seller may offer the advantage of delivery of a product in less time, compared to the base e-commerce website (e.g. Amazon.com). Thus, the user may prefer the local business or individual seller. In general, e-commerce network can pave the way for fair competition of the small to medium scale enterprises against large scale e-commerce websites worldwide. Furthermore, e-commerce websites including service provider websites for e-commerce websites (e.g. fake review analyzing websites or engines) may be integrated by user generated software apps.

As an example implementation, the current disclosure may be used to provide an integrated data verification system. Doctored or fabricated news may be marked on the web pages on which they are published (i.e. at the source of information) as doctored or fake news. Information, —especially news—published on the internet may be verified through various verification organizations, and actually there exists many websites dedicated for verification of information, but, suspicious or fake news are listed within their websites only. By the very nature of this technology, verification services may be integrated. Once a web resource is flagged (marked) by a verification service provider, that flag sticks to it and appears wherever that resource appears on the Web. Thus, system users may be aware of the disinformation. For example, once the core page of a fake news item is flagged then its link previews are also flagged wherever they appear. For example, social media posts, or a search engine result—containing the news item's core page—may be flagged. Special alert icons may be designed for this purpose. For example; a red exclamation mark icon may appear over hoax video or a fake news link. Similarly, suspicious news may be indicated with yellow and verified ones may be indicated with a green tick mark. Furthermore, there may be software applications developed to automatize the process, which may scan the web resources and compare the scanned information with the information published in news verification websites and flag them by indicating the reference verification source/s.

As an example implementation, the current disclosure may be used to provide an entertainment platform. A superimposed entertainment network, fully devoted to entertainment, may be set up. For example, visual elements—of web pages—that contain images may be transformed into virtual graffiti fields through a dedicated app so that system users may manipulate images if they wish so. Or, a dedicated app developed for superimposed animation may be executed on web resources. For example, an animated character, e.g. Pac-Man, may digest the ASCII characters of a governmental site while strolling on the web pages.

As an example implementation, the current disclosure may be used for providing a universal platform for the evaluation and criticism of information, which can be named as 'Critical Network'. In Critical Network, system users may criticize all kinds of information existing/circulating at the web via superimposed critical posts. Although, critical posts are no different from ordinary posts, the scoring and ranking algorithms differs from ordinary posts. Scoring and ranking is based more on quality, i.e. critical thinking, than on quantity, i.e. popularity criteria. Critical thinking is defined herein as: 'An intellectually disciplined process of actively and skillfully conceptualizing, applying, analyzing, synthesizing, and/or evaluating information gathered from, or generated by, observation, experience, reflection, reasoning, or communication, as a guide to belief and action.'. This definition also constitutes the critical thinking criteria. In this regard, Critical Network publishers are expected to create posts conforming to the critical thinking criteria where they support analytical, positive or negative criticism by concrete evidence. A ranking algorithm may also be used for critical posts as such: There exists two kinds of scoring for each critical post, namely technical/objective and artistic/subjective. Citations by Critical Network publishers from other critical posts score points for that critical post and its publisher as well. In scoring critical posts, points from Critical Network publishers and from ordinary system users are calculated separately, each using its own coefficient. For example, the general formula for scoring may be as follows: $a \times$(Mean Objective Criticism Network Score)+$b \times$(Mean Subjective Criticism Network Score)+$c \times$(Mean Subjective Ordinary System User Score). In one embodiment, critical posts are evaluated and scored by both software algorithms and other Critical Network publishers based on critical thinking criteria. It does not matter, however, where and in which web resource the publishers add their critical posts nor whether they have a serious or humorous style. The resource where they add a critical post may be an elite faculty web page where only philosophy, physics or mathematics are discussed, or the page of a social media phenomenon for fun only. A critical post may have a serious style like an academic essay or a humorous and entertaining style. These do not matter in technical/objective scoring as long as a critical post conforms to the critical thinking criteria. In another embodiment, Critical Network provides a self-controlled platform (e.g. like the Wikipedia model) where Critical Network publisher's critical posts may also be criticized by examining and criticizing the entry of each other. In yet another embodiment, ordinary system users may publish critical posts, though only those with a certain score may be officially entitled to be a Critical Network publisher. Special markers may be used for differentiating between official Critical Network publishers from ordinary users. Critical Network may be a universal platform of criticism/commentary based on quality rather than quantity in all areas such as philosophy, science, art, sports, politics, etc. through the unrestricted range of action it provides. Critical Network may provide feedback enabling the verification of information published on the internet at the source of information. Publications, articles and columns of sources such as local or global news agencies, newspapers, TV and internet networks may be criticized right at the source. It may be possible, as a rule, to criticize any type of authority (whether personal or institutional) directly at the source—even the critical posts of the Critical Network can be criticized. Information (e.g. news) published on the internet may be verified through Critical Network. Doctored or fabricated news may be marked on the web pages on which they are published (i.e. at the source of information) as doctored or fake news (alert icons may be designed for this purpose). One of the major constraints of the Web today is that there is very limited quality control on the information in circulation including the news served. In this respect, Critical Network may provide an autonomous fast responding global data control mechanism on the Web. Moreover, Critical Network may also contribute greatly to the dissemination of critical intelligence and skepticism worldwide. Uncensored analytical criticism directly at the source can reduce social/massive reaction time and increase the quality feedback, thus enhancing overall intelligence.

Transforming the Web into an unlimited interaction area including 'machine to machine', 'human to machine', and 'human to human' interaction is at the core of the concept of Superimposed Communication. A platform based on this approach does not only bypass interactive limitations of the websites, but also enables users to challenge and evaluate information right at the source, and improve the services provided by websites for the benefit of mankind. And, because interaction is the key to evolution, such a platform shall eventually and inevitably pave the way for the evolution of information and services on the Web, while corroding the monopoly power of major websites and social media networks by extending the borders of interaction far beyond their scope.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

In some examples, each unit, subunit, and/or module of the system may include a logical component. Each logical component may be hardware or a combination of hardware and software. For example, each logical component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each logical component may include memory hardware, such as a portion of the memory, for example, that comprises instructions executable with the processor or other processors to implement one or more of the features of the logical components. When any one of the logical components includes the portion of the memory that comprises instructions executable with the processor, the logical component may or may not include the processor. In some examples, each logical components may just be the portion of the memory or other physical memory that comprises instructions executable with the processor or other processor to implement the features of the corresponding logical component without the logical component including any other hardware. Because each logical component includes at least some hardware even when the included hardware comprises software, each logical component may be interchangeably referred to as a hardware logical component.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, ... and <N>" or "at least one of <A>, <B>, ... <N>, or combinations thereof" or "<A>, <B>, ... and/or <N>" are defined by the Applicant in the broadest sense, superseding any other implied definitions hereinbefore or hereinafter unless expressly asserted by the Applicant to the contrary, to mean one or more elements selected from the group comprising A, B, ... and N. In other words, the phrases mean any combination of one or more of the elements A, B, ... or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The invention claimed is:

1. A method comprising:
analyzing a rendered web page being viewed by a user;
identifying visual elements in the web page;
generating, for each of the identified visual elements, uniform visual element identifiers (UVEIs), each of the UVEIs uniquely identifying a corresponding one of the identified visual elements;
associating, with each of the UVEIs, information regarding the web page, distinctive information and/or properties of content of the corresponding one of the visual elements, and a relative position of the corresponding one of the visual elements in the web page;
categorizing each of the visual elements into one of a plurality of predetermined categories;
identifying, for each of the visual elements, cluster information to interrelate the visual elements within the web page, the cluster information identified for each of the visual elements based on respective relative position of the visual elements, respective functional relationships of the visual elements with other visual elements, or both;
filtering the visual elements to identify those of the visual elements available for user interaction, the filtering based on predetermined filter criteria comprising the cluster information and the categorization into the one of the plurality of predetermined categories;
receiving an input representative of a user interaction with one of the visual elements available for user interaction;
analyzing the rendered web page being viewed by another user and/or when the web page is subsequently rendered;
identifying the visual elements in the web page;
generating, for each of the identified visual elements, new uniform visual identifiers (nUVEIs), each of the nUVEIs uniquely identifying a corresponding one of the identified visual elements;
associating, with each of the nUVEIs, information regarding the web page, distinctive information and/or properties of content of the corresponding one of the visual elements, and a relative position of the corresponding one of the visual elements in the web page;
categorizing each of the visual elements into one of a plurality of predetermined categories;
comparing the nUVEIs with UVEIs stored in a database as recorded UVEIs (rUVEIs); and
associating the nUVEIs with the rUVEIs based on a predefined threshold of similarity.

2. The method of claim 1, wherein categorizing each of the visual elements into one of the plurality of predetermined categories comprises categorizing each of the visual elements as possessing only an operational function, or as possessing an operational function and a subjective function.

3. The method of claim 2, wherein categorizing each of the visual elements into one of the plurality of predetermined categories comprises categorizing into one of a plurality of predetermined roles, the predetermined roles comprising an auxiliary element role for the visual elements possessing only the operational function, and a main content role or a side role for the visual elements possessing the operational function and the subjective function, wherein the main content role is representative of a visual element that is a main content subject of the web page and the side role is representative of a subaltern subject of the web page.

4. The method of claim 3, wherein filtering the visual elements comprises:

applying a predefined filtering criteria as only main content, only side content, only auxiliary elements, or any combination thereof, to identify filtered visual elements;
enabling filtered visual elements for interaction; and
disabling remaining visual elements.

5. The method of claim 1, further comprising, in response to receipt of the input representative of the user interaction, storing user content input in a database in association with a UVEI of the one of the visual elements available for user interaction.

6. The method of claim 5, further comprising storing a unique identifier of the user as an author of the user content input in the database in association with the UVEI of the one of the visual elements available for user interaction.

7. The method of claim 6, further comprising rendering the web page for another user to include an indicator of the user content input and the unique identifier of the user as the author; and receiving a connection request from the other user to initiate communication with the user as the author of the user content input.

8. The method of claim 1, wherein receiving the input representative of the user interaction with one of the visual elements available for user interaction comprises storing the user interaction with the one of the visual elements as user content input in association with a UVEI uniquely identified as corresponding to the one of the visual elements.

9. The method of claim 1, wherein categorizing each of the visual elements into one of a plurality of predetermined categories comprises identifying, for each of the visual elements, cluster information to interrelate the visual elements within the web page, the cluster information identified for each of the visual elements based on respective relative position of the visual elements, respective functional relationships of the visual elements with other visual elements, or both.

10. A method comprising:
analyzing a rendered web page being viewed by a user;
identifying visual elements in the web page;
generating, for each of the identified visual elements, uniform visual element identifiers (UVEIs), each of the UVEIs uniquely identifying a corresponding one of the identified visual elements;
associating, with each of the UVEIs, information regarding the web page, distinctive information and/or properties of content of the corresponding one of the visual elements, and a relative position of the corresponding one of the visual elements in the web page;
categorizing each of the visual elements into one of a plurality of predetermined categories;
identifying, for each of the visual elements, cluster information to interrelate the visual elements within the web page, the cluster information identified for each of the visual elements based on respective relative position of the visual elements, respective functional relationships of the visual elements with other visual elements, or both;
filtering the visual elements to identify those of the visual elements available for user interaction, the filtering based on predetermined filter criteria comprising the cluster information and the categorization into the one of the plurality of predetermined categories;
receiving an input representative of a user interaction with one of the visual elements available for user interaction;
storing the user interaction with the one of the visual elements as user content input in association with the one of the UVEIs, said one of the UVEIs stored in a database as a recorded UVEI (rUVEI);

querying the database to compare the rUVEI to a new UVEI (nUVEI) generated for a visual element of the web page when the web page is subsequently rendered;

identifying the one of the visual elements associated with the rUVEI as matching the visual element associated with the nUVEI; and enabling availability of the user content input from the rUVEI for the visual element associated with the matching nUVEI.

11. The method of claim 10, wherein the user content input comprises a user generated software application.

12. The method of claim 10, wherein the user content input comprises a user generated content.

13. A system comprising:
a server computer configured to:
analyze a rendered web page being viewed by a user;
identify visual elements in the web page;
generate, for each of the identified visual elements, uniform visual element identifiers (UVEIs), each of the UVEIs uniquely identifying a corresponding one of the identified visual elements;
associate, with each of the UVEIs, information regarding the web page, distinctive information and/or properties of content of the corresponding one of the visual elements, and a relative position of the corresponding one of the visual elements in the web page;
categorize each of the visual elements into one of a plurality of predetermined categories;
identify, for each of the visual elements, cluster information to interrelate the visual elements within the web page, the cluster information identified for each of the visual elements based on respective relative position of the visual elements, respective functional relationships of the visual elements with other visual elements, or both;
filter the visual elements to identify those of the visual elements available for user interaction, the visual elements filtered based on predetermined filter criteria comprising the cluster information and the categorization into the one of the plurality of predetermined categories;
receive an input representative of a user interaction with one of the visual elements available for user interaction;
analyze the rendered web page being viewed by another user and/or when the web page is subsequently rendered;
identify the visual elements in the web page;
generate, for each of the identified visual elements, new uniform visual identifiers (nUVEIs), each of the nUVEIs uniquely identifying a corresponding one of the identified visual elements;
associate, with each of the nUVEIs, information regarding the web page, distinctive information and/or properties of content of the corresponding one of the visual elements, and a relative positioning of the corresponding one of the visual elements in the web page;
categorize each of the visual elements into one of a plurality of predetermined categories;
compare the nUVEIs with UVEIs stored in a data base as recorded UVEIs (rUVEIs); and
associate the nUVEIs with the rUVEIs based on a predefined threshold of similarity.

14. The system of claim 13, wherein the server computer is further configured to categorize each of the visual elements as possessing only an operational function, or as possessing an operational function and a subjective function.

15. The system of claim 14, the server computer further configured to categorize each of the visual elements into one of a plurality of predetermined roles, the predetermined roles comprising an auxiliary element role for the visual elements possessing only the operational function, and a main content role or a side role for the visual elements possessing the operation function and the subjective function, wherein the main content role is representative of a visual element that is a main content subject of the web page and the side role is representative of a subaltern subject of the web page.

16. The system of claim 15, wherein the server computer is further configured to:
apply a predefined filtering criteria as only main content, only side content, only auxiliary elements, or any combination thereof, to identify filtered visual elements;
enabling filtered visual elements for interaction; and
disabling remaining visual elements.

17. The system of claim 13, wherein the server computer being configured to receive the input representative of the user interaction with one of the visual elements available for user interaction further comprises the server computer being configured to store the user interaction with the one of the visual elements as user content input in association with the one of the UVEIs.

18. The system of claim 13, wherein the server computer being configured to categorize each of the visual elements into one of a plurality of predetermined categories further comprises the server computer being configured to identify, for each of the visual elements, cluster information to interrelate the visual elements within the web page, the cluster information identified for each of the visual elements based on respective relative position of the visual elements, respective functional relationships of the visual elements with other visual elements, or both.

19. A system comprising:
a server computer configured to:
analyze a rendered web page being viewed by a user;
identify visual elements in the web page;
generate, for each of the identified visual elements, uniform visual element identifiers (UVEIs), each of the UVEIs uniquely identifying a corresponding one of the identified visual elements;
associate, with each of the UVEIs, information regarding the web page, distinctive information and/or properties of content of the corresponding one of the visual elements, and a relative position of the corresponding one of the visual elements in the web page;
categorize each of the visual elements into one of a plurality of predetermined categories;
identify, for each of the visual elements, cluster information to interrelate the visual elements within the web page, the cluster information identified for each of the visual elements based on respective relative position of the visual elements, respective functional relationships of the visual elements with other visual elements, or both;
filter the visual elements to identify those of the visual elements available for user interaction, the visual elements filtered based on predetermined filter criteria comprising the cluster information and the categorization into the one of the plurality of predetermined categories; receive an input representative of a user interaction with one of the visual elements available for user interaction;

store, in the database, the user interaction with the one of the visual elements as user content input in association with the one of the UVEIs, said one of the UVEIs stored in the database as a recorded UVEI (rUVEI);
query the database to compare the rUVEI to a new UVEI (nUVEI) generated for a visual element of the web page when the web page is subsequently rendered;
identify the one of the visual elements associated with the rUVEI as matching the visual element associated with the nUVEI; and
enable availability of the user content input from the rUVEI for the visual element associated with the matching nUVEI.

20. The system of claim 19, wherein the user content input comprises a user generated software application.

21. The system of claim 19, wherein the user content input comprises a user generated content.

22. A non-transitory computer readable medium storing instructions executable by a processor, the computer readable medium comprising:
instructions executable with the processor to analyze a rendered web page being viewed by a user;
instructions executable with the processor to identify visual elements in the web page;
instructions executable with the processor to generate, for each of the identified visual elements, uniform visual identifiers (UVEIs), each of the UVEIs uniquely identifying a corresponding one of the identified visual elements;
instructions executable with the processor to associate, with each of the UVEIs, information regarding the web page, distinctive information and/or properties of content of the corresponding one of the visual elements, and a relative position of the corresponding one of the visual elements in the web page;
instructions executable with the processor to categorize each of the visual elements into one of a plurality of predetermined categories;
instructions executable with the processor to identify, for each of the visual elements, cluster information to interrelate the visual elements within the web page, the cluster information identified for each of the visual elements based on respective relative position of the visual elements, respective functional relationships of the visual elements with other visual elements, or both;
instructions executable with the processor to filter the visual elements to identify those of the visual elements available for user interaction, the filtering based on predetermined filter criteria comprising the cluster information and the categorization into the one of the plurality of predetermined categories;
instructions executable with the processor to receive an input representative of a user interaction with one of the visual elements available for user interaction;
instructions executable with the processor to store the user interaction with the one of the visual elements as user content input in association with the one of the UVEIs, said one of the UVEIs stored in a database as a recorded UVEI (rUVEI);
instructions executable with the processor to query the database to compare the rUVEI to a new UVEI (nUVEI) generated for a visual element of the web page when the web page is subsequently rendered;
instructions executable with the processor to identify the one of the visual elements associated with the rUVEI as matching the visual element associated with the nUVEI; and
instructions executable with the processor to enable availability of the user content input from the rUVEI for the visual element associated with the nUVEI.

23. A method comprising:
analyzing a rendered web page being viewed by a user;
identifying visual elements in the web page;
generating, for each of the identified visual elements, uniform visual element identifiers (UVEIs), each of the UVEIs uniquely identifying a corresponding one of the identified visual elements;
associating, with each of the UVEIs, information regarding the web page, distinctive information and/or properties of content of the corresponding one of the visual elements, and a relative position of the corresponding one of the visual elements in the web page;
categorizing each of the visual elements into one of a plurality of predetermined categories;
identifying, for each of the visual elements, cluster information to interrelate the visual elements within the web page, the cluster information identified for each of the visual elements based on respective relative position of the visual elements, respective functional relationships of the visual elements with other visual elements, or both;
filtering the visual elements to identify those of the visual elements available for user interaction, the filtering based on predetermined filter criteria comprising the cluster information and the categorization into the one of the plurality of predetermined categories;
receiving an input representative of a user interaction with one of the visual elements available for user interaction;
storing the user interaction with the one of the visual elements as user content input in association with the one of the UVEIs;
analyzing the rendered web page being viewed by another user and/or when the web page is subsequently rendered;
identifying the visual elements in the web page;
generating, for each of the identified visual elements, new uniform visual identifiers (nUVEIs), each of the nUVEIs uniquely identifying a corresponding one of the identified visual elements;
associating, with each of the nUVEIs, information regarding the web page, distinctive information and/or properties of content of the corresponding one of the visual elements, and a relative position of the corresponding one of the visual elements in the web page;
categorizing each of the visual elements into one of a plurality of predetermined categories;
identifying, for each of the visual elements, cluster information to interrelate the visual elements within the web page, the cluster information identified for each of the visual elements based on respective relative position of the visual elements, respective functional relationships of the visual elements with other visual elements, or both;
comparing the nUVEIs with UVEIs stored in a database as recorded UVEIs (rUVEIs); and
associating the nUVEIs with the rUVEIs based on a predefined threshold of similarity.

24. A system comprising:
a server computer configured to:
analyze a rendered web page being viewed by a user;
identify visual elements in the web page;

generate, for each of the identified visual elements, uniform visual element identifiers (UVEIs), each of the UVEIs uniquely identifying a corresponding one of the identified visual elements;

associate, with each of the UVEIs, information regarding the web page, distinctive information and/or properties of content of the corresponding one of the visual elements, and a relative position of the corresponding one of the visual elements in the web page;

categorize each of the visual elements into one of a plurality of predetermined categories;

identify, for each of the visual elements, cluster information to interrelate the visual elements within the web page, the cluster information identified for each of the visual elements based on respective relative position of the visual elements, respective functional relationships of the visual elements with other visual elements, or both;

filter the visual elements to identify those of the visual elements available for user interaction, the visual elements filtered based on predetermined filter criteria comprising the cluster information and the categorization into the one of the plurality of predetermined categories;

receive an input representative of a user interaction with one of the visual elements available for user interaction;

store the user interaction with the one of the visual elements as user content input in association with the one of the UVEIs;

analyze the rendered web page being viewed by another user and/or when the web page is subsequently rendered;

identify the visual elements in the web page;

generate, for each of the identified visual elements, new uniform visual identifiers (nUVEIs), each of the nUVEIs uniquely identifying a corresponding one of the identified visual elements;

associate, with each of the nUVEIs, information regarding the web page, distinctive information and/or properties of content of the corresponding one of the visual elements, and a relative positioning of the corresponding one of the visual elements in the web page;

categorize each of the visual elements into one of a plurality of predetermined categories;

identify, for each of the visual elements, cluster information to interrelate the visual elements within the web page, the cluster information identified for each of the visual elements based on respective relative position of the visual elements, respective functional relationships of the visual elements with other visual elements, or both;

compare the nUVEIs with UVEIs stored in a data base as recorded UVEIs (rUVEIs); and associate the nUVEIs with the rUVEIs based on a predefined threshold of similarity.

* * * * *